(12) United States Patent
Kwon et al.

(10) Patent No.: US 12,324,536 B2
(45) Date of Patent: Jun. 10, 2025

(54) COOKING APPARATUS AND METHOD OF CONTROLLING THE COOKING APPARATUS

(71) Applicant: SAMSUNG ELECTRONICS CO., LTD., Suwon-si (KR)

(72) Inventors: Jae Sung Kwon, Seoul (KR); Yong Jong Park, Seongnam-si (KR); Boo Keun Yoon, Yongin-si (KR); Han Jun Sung, Seoul (KR); Joo-Young Ha, Suwon-si (KR); Jeong Su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 904 days.

(21) Appl. No.: 17/472,229

(22) Filed: Sep. 10, 2021

(65) Prior Publication Data
US 2021/0401215 A1 Dec. 30, 2021

Related U.S. Application Data

(63) Continuation of application No. 15/720,630, filed on Sep. 29, 2017, now Pat. No. 11,116,348.

(30) Foreign Application Priority Data

Sep. 30, 2016 (KR) .................. 10-2016-0127121

(51) Int. Cl.
A47J 27/00 (2006.01)
A47J 36/00 (2006.01)
(Continued)

(52) U.S. Cl.
CPC ............. A47J 27/002 (2013.01); A47J 36/00 (2013.01); A47J 36/16 (2013.01); F24C 7/06 (2013.01);
(Continued)

(58) Field of Classification Search
CPC .......... A47J 27/002; A47J 36/00; A47J 36/16; A61B 17/8014; A61B 17/8023;
(Continued)

(56) References Cited

U.S. PATENT DOCUMENTS 4,137,442 A    1/1979   Tateda
4,357,513 A    11/1982  Kawata et al.
(Continued)

FOREIGN PATENT DOCUMENTS

EP    0 966 180    12/1999
EP    1 058 483    12/2000
(Continued)

OTHER PUBLICATIONS

Office Action dated Feb. 16, 2024 issued in Korean Application No. 10-2023-0090682.
(Continued)

Primary Examiner — Vy T Nguyen
(74) Attorney, Agent, or Firm — STAAS & HALSEY LLP

(57) ABSTRACT

A cooking apparatus includes a cooking chamber, a cooking plate having a visual representation distinguishing a plurality of areas on a top surface of the cooking plate, a plurality of heaters configured to supply heat to the plurality of areas and a controller configured to receive information about a cooking object including a plurality of pieces of food having different cooking conditions, based on the information about the cooking object, determine a first heating intensity to be used to heat the first piece of the food, and a second heating intensity to be used to heat the second piece of the food, control the plurality of heaters to supply heat of the first heating intensity to the first area, and control the plurality of heaters to supply heat of the second heating intensity to the second area.

13 Claims, 33 Drawing Sheets

(51) Int. Cl.
*A47J 36/16* (2006.01)
*F24C 7/06* (2006.01)
*F24C 7/08* (2006.01)
*H05B 6/64* (2006.01)
*H05B 6/66* (2006.01)
*H05B 6/80* (2006.01)

(52) U.S. Cl.
CPC ........... *F24C 7/085* (2013.01); *H05B 6/6402* (2013.01); *H05B 6/6411* (2013.01); *H05B 6/6441* (2013.01); *H05B 6/645* (2013.01); *H05B 6/6482* (2013.01); *H05B 6/668* (2013.01); *H05B 6/80* (2013.01)

(58) Field of Classification Search
CPC .. A61N 1/05; A61N 1/326; A61N 2007/0013; A61N 2/002; A61N 2/004; A61N 2/02; A61N 2/06; A61N 7/00; H05B 6/6402; H05B 6/6411; H05B 6/6441; H05B 6/645; H05B 6/6482; H05B 6/668; H05B 6/80

See application file for complete search history.

(56) References Cited

U.S. PATENT DOCUMENTS

| | | | |
|---|---|---|---|
| 4,629,850 | A | 12/1986 | Tanabe |
| 5,747,781 | A | 5/1998 | Kim et al. |
| 6,274,859 | B1 | 8/2001 | Yoshino et al. |
| 6,469,286 | B1 | 10/2002 | Nobue et al. |
| 6,630,655 | B2 | 10/2003 | Fukunaga et al. |
| 6,930,294 | B2 | 8/2005 | Kim |
| 10,760,794 | B2 | 9/2020 | Cheng |
| 2002/0005406 | A1 | 1/2002 | Fukunaga et al. |
| 2002/0158065 | A1* | 10/2002 | Taino ............... H05B 6/68 219/710 |
| 2004/0104219 | A1 | 6/2004 | Kim |
| 2009/0032521 | A1 | 2/2009 | Kim et al. |
| 2009/0208614 | A1 | 8/2009 | Sharma et al. |
| 2013/0186887 | A1* | 7/2013 | Hallgren ............ H05B 6/688 219/702 |
| 2013/0336131 | A1 | 12/2013 | Zhang et al. |
| 2014/0203012 | A1 | 7/2014 | Corona et al. |
| 2014/0318386 | A1 | 10/2014 | Kim |
| 2015/0285512 | A1 | 10/2015 | Matarazzi et al. |
| 2016/0192446 | A1* | 6/2016 | Seddik ............... H05B 6/6455 219/705 |

FOREIGN PATENT DOCUMENTS

| | | |
|---|---|---|
| JP | 59-138822 | 8/1984 |
| JP | JP 2012125526 A * | 7/2012 |
| KR | 1996-0013129 | 4/1996 |
| KR | 10-2001-0104621 | 11/2001 |
| KR | 10-2004-0048276 | 6/2004 |
| KR | 10-0630458 | 9/2006 |
| KR | 10-2007-0000165 | 1/2007 |
| KR | 10-2009-0044749 | 5/2009 |
| WO | 2011/016405 A1 | 2/2011 |
| WO | WO 2014/044627 A2 | 3/2014 |

OTHER PUBLICATIONS

International Search Report mailed Jan. 19, 2018, in corresponding International Patent Application No. PCT/KR2017/010943, 3 pgs.
Extended European Search Report dated May 23, 2019 in corresponding European Patent Application No. 17856824.2.
Chinese Office Action dated Feb. 6, 2020 in Chinese Patent Application No. 201780057396.5.
European Communication dated Jul. 27, 2020 in European Patent Application No. 17856824.2.
Chinese Office Action dated Jul. 16, 2020 in Chinese Patent Application No. 2017800157396.5.
U.S. Office Action dated May 16, 2019 from U.S. Appl. No. 15/720,630.
U.S. Final Office Action dated Nov. 29, 2019 from U.S. Appl. No. 15/720,630.
U.S. Office Action dated Mar. 19, 2020 from U.S. Appl. No. 15/720,630.
U.S. Final Office Action dated Aug. 21, 2020 from U.S. Appl. No. 15/720,630.
U.S. Notice of Allowance dated May 12, 2021 from U.S. Appl. No. 15/720,630.
U.S. Restriction Requirement dated Feb. 13, 2019 from U.S. Appl. No. 15/720,630.
U.S. Appl. No. 15/720,630, filed Sep. 29, 2017, Jae Sung Kwon, Samsung Electronics Co., Ltd.
Office Action dated Oct. 13, 2022 issued in Korean Application 10-2016-0127121.

* cited by examiner

COOKING APPARATUS AND METHOD OF CONTROLLING THE COOKING APPARATUS

CROSS-REFERENCE TO RELATED APPLICATION

This application is a continuation of U.S. patent application Ser. No. 15/720,630 filed on Sep. 29, 2017 in the U.S. Patent and Trademark Office and claims the benefit of Korean Patent Application No. 10-2016-0127121, filed on Sep. 30, 2016 in the Korean Intellectual Property Office, the disclosure of which is incorporated herein by reference.

BACKGROUND

1. Field

Embodiments of the present disclosure relate to a cooking apparatus and a method of controlling the cooking apparatus.

2. Description of the Related Art

A cooking apparatus is an apparatus for heating and cooking a cooking object such as food and refers to an apparatus capable of providing several functions in relation to cooking of a cooking object such as heating, thawing, drying, and sterilizing. Ovens such as a gas oven and an electric oven, a microwave heating apparatus (hereinafter, referred to as a microwave), a gas stove, an electric stove, a gas grill, an electric grill, and the like are examples of cooking apparatuses.

An oven is an apparatus capable of roasting, frying, steaming, boiling, or thawing a cooking object by using a cooking chamber that provides a cooking space and a heating means that heats an inside of the cooking chamber. When a user inserts a cooking object into the cooking chamber and closes the cooking chamber, the oven cooks the cooking object inserted into the cooking chamber by applying a certain heat to the cooking object. Ovens may be classified into a gas oven that obtains heat to be applied to a cooking object by burning a gas and an electric oven that obtains heat to be applied to a cooking object by converting electrical energy into heat energy.

SUMMARY

Therefore, it is an aspect of the present disclosure to provide a cooking apparatus configured to cook a plurality of types of food having different cooking conditions such as whether heating is required, a heating time, and a heating degree in one cooking space, and a method of controlling the cooking apparatus.

Additional aspects of the present disclosure will be set forth in part in the description which follows and, in part, will be apparent from the description, or may be learned by practice of the present disclosure.

Provided are a cooking apparatus and a method of controlling the cooking apparatus.

The cooking apparatus may include a cooking chamber, a rotating plate rotatably installed at a bottom of an inside of the cooking chamber and including a plurality of areas formed on a top surface thereof, and a first heating portion installed in the cooking chamber and configured to supply heat to a first area of the plurality of areas when the first area is moved to a heating position by a rotation of the rotating plate.

A second area adjacent to the first area of the plurality of areas may move to the heating position according to the rotation of the rotating plate, and the first heating portion may supply heat to the second area.

The first heating portion may supply less heat to the second area than the heat supplies to the first area.

A third area adjacent to the second area of the plurality of areas may move to the heating position according to the rotation of the rotating plate, and the first heating portion may supply less heat to the third area than the heats supplies to the second area.

The first heating portion may move to a position adjacent to the heating position when the rotating plate rotates to place one of the plurality of areas of the top surface of the rotating plate to the heating position, or may move to the position adjacent to the heating position before the rotating plate rotates to place the one of the plurality of areas of the top surface of the rotating plate to the heating position.

The first heating portion may be provided to be movable toward the bottom of the inside of the cooking chamber and toward a ceiling of the inside of the cooking chamber.

The cooking apparatus may further include at least one slit formed at a side or rear surface of the inside of the cooking chamber and provided along a movement direction of the first heating portion, and a shielding portion installed outside the cooking chamber and configured to move along with the movement of the first heating portion and shield the slit.

The first heating portion may be provided to be pivotable between the bottom and a side of the inside of the cooking chamber.

The cooking apparatus may further include an inputter configured to receive information on a cooking object, a temperature sensor configured to measure a temperature of at least one of the plurality of areas, an area position sensor configured to sense a position of each of the plurality of areas, and a rotational angle sensor configured to sense a rotational angle of the rotating plate.

The cooking apparatus may further include a controller configured to control operations of the rotating plate and the first heating portion by using at least one of the inputter, the temperature sensor, the area position sensor, and the rotational angle sensor.

The controller may determine at least one of a level of heat and a heat supply time of the first heating portion based on the temperature of the at least one area measured by the temperature sensor and the information on the cooking object input through the inputter.

The cooking apparatus may further include a second heating portion configured to heat the entire top surface of the rotating plate. Here, the controller may control the second heating portion to heat the entire top surface of the rotating plate and then rotate the rotating plate to place one of the plurality of areas of the top surface of the rotating plate to the heating position.

A method of controlling a cooking apparatus may include rotating a rotating plate rotatably installed at a bottom of an inside of a cooking chamber to place a first area of a plurality of areas provided at a top surface of the rotating plate to a heating position, and supplying, by a first heating portion installed in the cooking chamber, heat to the first area.

The method may further include rotating the rotating plate to place a second area adjacent to the first area of the plurality of areas to the heating position and supplying, by the first heating portion, heat to the second area.

The first heating portion may supply less heat to the second area than the heat supplies to the first area.

The method may further include rotating the rotating plate to place a third area adjacent to the second area of the plurality of areas to the heating position and stopping the supply of heat to the third area or supplying less heat to the third area than the heat supplies to the second area, by the first heating portion.

The method may further include moving the first heating portion to a position adjacent to the heating position when the rotating plate rotates to place one of the plurality of areas of the top surface of the rotating plate to the heating position or moving the first heating portion to the position adjacent to the heating position before the rotating plate rotates to place one of the plurality of areas of the top surface of the rotating plate to the heating position.

The first heating portion may be provided to be movable toward the bottom of the inside of the cooking chamber and toward a ceiling of the inside of the cooking chamber or to be pivotable between the bottom and a side of the inside of the cooking chamber.

The method may further include measuring a temperature of at least one of the plurality of areas or receiving information on a cooking object and determining at least one of a level of heat and a heat supply time of the first heating portion on the basis of the temperature of the at least one area and the information on the cooking object.

The method may further include supplying, by the second heating portion, heat to an entire top surface of the rotating plate.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Hereinafter, for convenience of description, a direction in which a door 30 is installed in a cooking apparatus 1 will be referred to as a frontward direction and a direction opposite to the frontward direction will be referred to as a rearward direction. Also, when the cooking apparatus 1 is installed using a general method, a direction toward the ground will be referred to as a downward direction and a direction opposite to the downward direction will be referred to as an upward direction. Also, one of directions intersecting with both a line segment that connects the upward direction to the downward direction and a line segment that connects the frontward direction and the rearward direction will be referred to as a leftward direction and a direction opposite to the leftward direction will be referred to as a rightward direction. However, the above-described directions are defined merely for convenience of description with respect to the cooking apparatus 1 and may be freely defined according to a selection of a designer.

Hereinafter, one embodiment of the cooking apparatus 1 will be described with reference to FIGS. 1 to 16.

Figure 1:
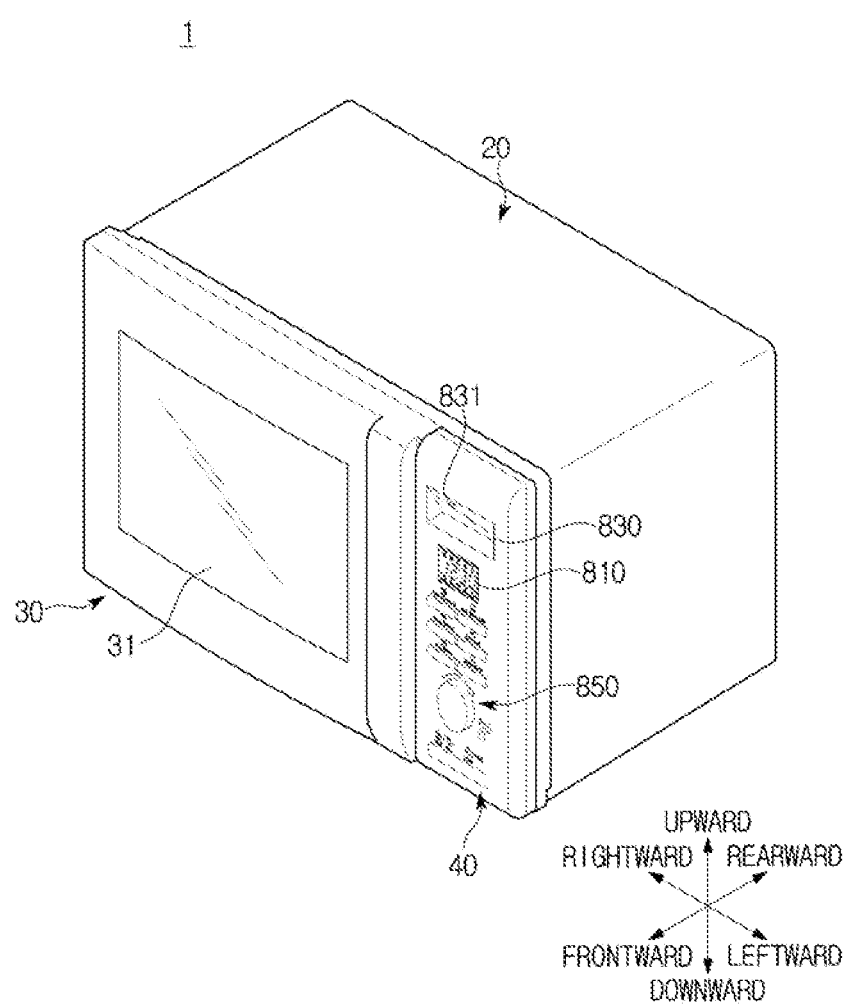
FIG. 1 is a perspective view illustrating one embodiment of a cooking apparatus.
Figure 2:
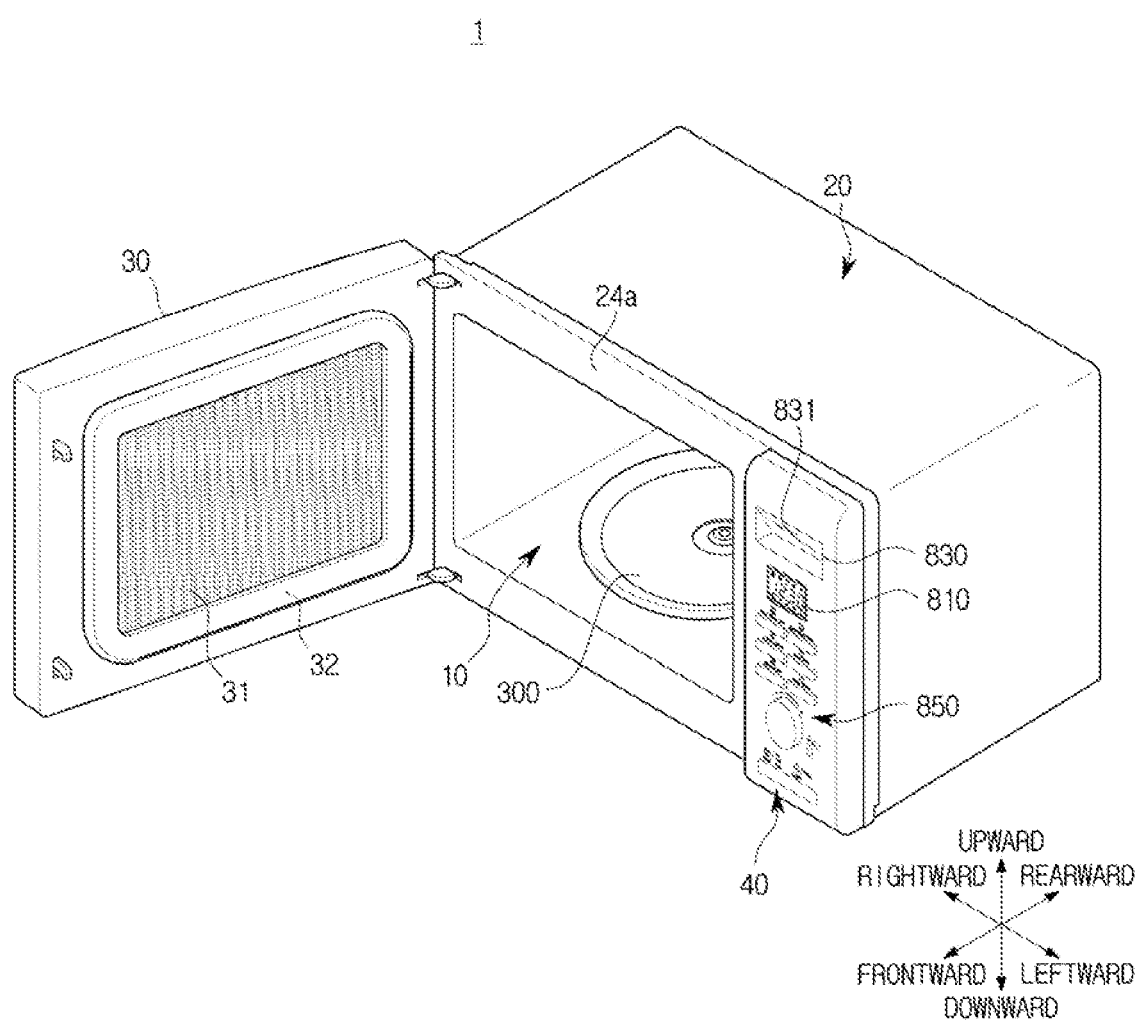
FIG. 2 is a perspective view illustrating one embodiment of a state in which a door is opened.

FIG. 1 is a perspective view illustrating one embodiment of the cooking apparatus 1, and FIG. 2 is a perspective view illustrating one embodiment of a state in which a door is opened.

Referring to FIGS. 1 and 2, the cooking apparatus 1 may include an external housing 20 configured to form an overall exterior of the cooking apparatus 1, the door 30 provided in front of the external housing 20, and a user interface panel 40 provided on a front surface of the external housing 20 next to the door 30.

An opening 24a configured to be closed or opened by the door 30 to allow a cooking object to be inserted into and withdrawn from a cooking chamber 10 is provided at the front of the external housing 20. The opening 24a extends and forms the cooking chamber 10 in the external housing 20. When the opening 24a is opened, a cooking object may be accommodated in the cooking chamber 10 through the opened opening 24a.

The door 30 is formed to open and close the opening 24a formed at the front surface of the external housing 20. Depending on embodiments, the door 30 may be hinge-coupled with the external housing 20 and pivot around a hinge shaft to open and close the opening 24a or may be slidably coupled with the external housing 20 to open and close the opening 24a. In addition, the door 30 may be installed at the external housing 20 using various methods to open and close the opening 24a.

According to one embodiment, the door 30 may include a transparent window 31 to allow a user to view an inside of the cooking chamber 10. Also, the door 30 may include an opening insertion portion 32 to allow the door 30 to be stably inserted into and coupled to the opening 24a. The opening insertion portion 32 may be formed surrounding a perimeter of the transparent window 31.

The user interface panel 40 may be formed at a front surface of an electronic component chamber in which various electronic components related to operation of the cooking apparatus 1 are installed. The user interface panel 40 may include various user interfaces 800.

The user interface 800 is configured to receive various pieces of information or user commands from a user or to perform a function providing various pieces of information related to the operation of the cooking apparatus 1 or various pieces of living information to the user as necessary.

The user interface 800, for example, may include at least one of a display 810 configured to provide various pieces of information to the user as visual images, a barcode scanner 830 configured to receive information by scanning an external barcode, and an inputter 850 configured to output an electrical signal corresponding to an operation of the user and receive a user command.

The display 810 may provide various pieces of information to the user by using symbols, characters, figures, numbers, or a combination thereof. For example, the display 810 may visibly provide the user with at least one of a current time, a set total cooking period, a period for which cooking has been performed, a remaining cooking period, a set cooking temperature, a current cooking temperature, an operation mode of the cooking apparatus 1, whether a first heating portion 100 (refer to FIG. 16) is operating, whether a second heating portion 200 (refer to FIG. 16) is operating, a type or state of an ingredient, a temperature of the inside of the cooking chamber 10, and various pieces of information related to the operation of the cooking apparatus 1.

According to one embodiment, the display 810 may be embodied using a cathode ray tube (CRT), various types of display panel, or the like. Here, a display panel may be embodied using, for example, a liquid crystal display (LCD) panel, a light emitting diode (LED) display panel, an organic LED (OLED) display panel, an active-matrix OLED (AMOLED) display panel or the like. According to one embodiment, the display 810 may be embodied as a touch screen. In this case, the display 810 may perform a function of the inputter 850.

Figure 16:
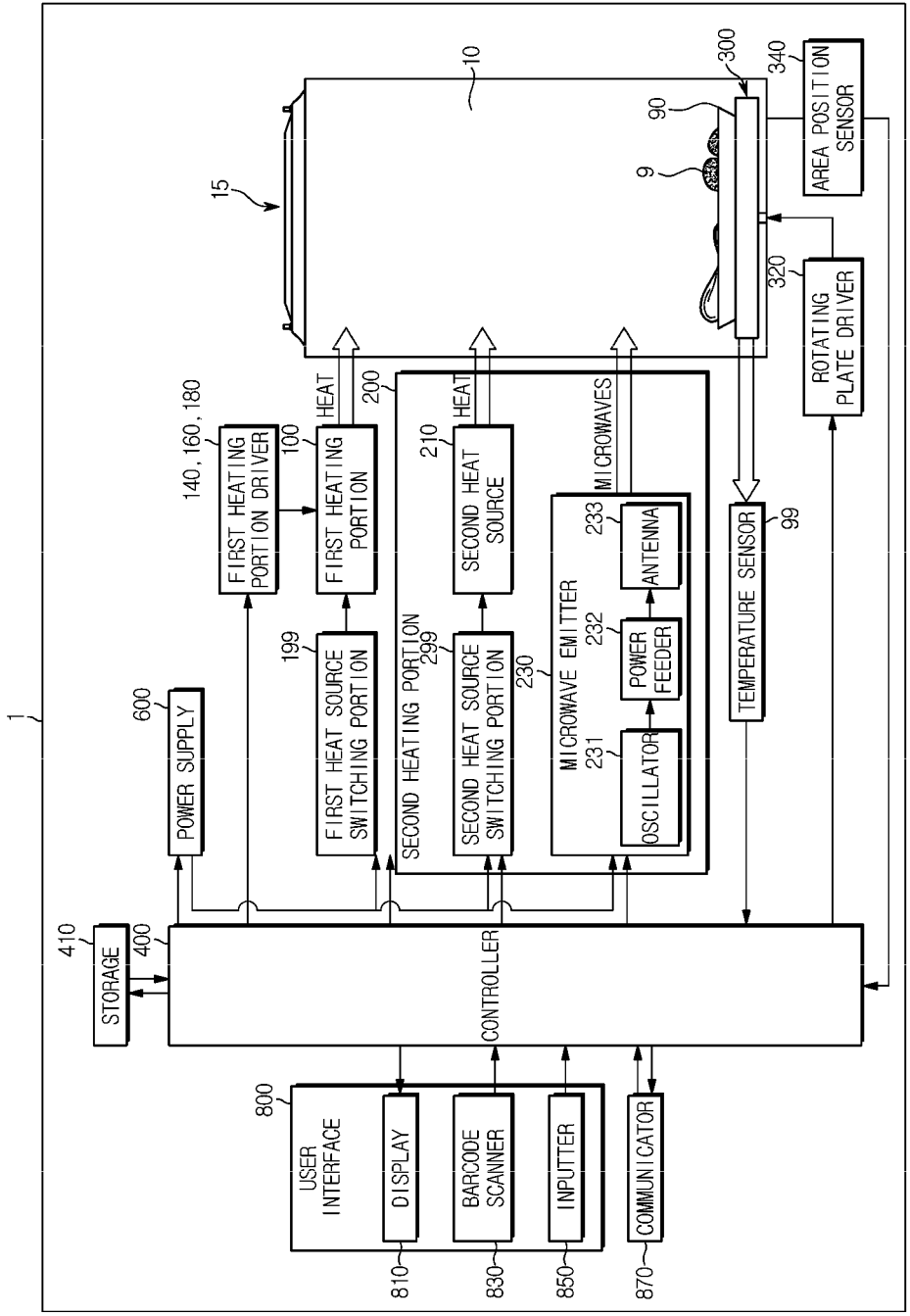
FIG. 16 is a control block diagram illustrating one embodiment of the cooking apparatus.

The barcode scanner 830 may recognize and take a picture of a barcode, and may transmit information of the barcode whose picture is taken to a controller 400 (refer to FIG. 16). Here, the barcode may include a one-dimensional barcode, a two-dimensional barcode such as a quick response (QR) code, a color barcode, and the like.

The barcode scanner 830 may continuously or periodically emit infrared rays and the like. Also, when a barcode printed on a container 90 of a cooking object 9 approaches a front of a lens 831 of the barcode scanner 830, the barcode scanner 830 may emit infrared rays and the like.

When the barcode approaches the front of the lens 831 of the barcode scanner 830, the barcode scanner 830 recognizes and takes a picture of the barcode and transmits an image of the barcode and information extracted from the barcode to the controller 400. The controller 400 obtains information necessary for the operation of the cooking apparatus 1 based on the information extracted from the image of the received barcode or the information extracted from the barcode and controls the operation of the cooking apparatus 1 on the basis of the obtained information. Here, the information necessary for the operation of the cooking apparatus 1 may include cooking conditions of a cooking object such as a cooking temperature and a cooking time, a type of the cooking object, an amount of the cooking object, an operation mode of the cooking apparatus 1, and the like. For example, when information on a particular cooking object, for example, information on cooking conditions of the cooking object, is obtained from a barcode as a result of deciphering information on the barcode, the controller 400 may transmit control signals to various components in the cooking apparatus 1 to set conditions of the cooking apparatus 1 to be adequate for cooking the particular cooking object on the basis of the obtained information.

The inputter 850 may receive various user commands or various pieces of information related to the operation of the cooking apparatus 1. According to one embodiment, the inputter 850 may be embodied using at least one of various physical buttons, a keyboard device, a knob, a stick-type operation device, a mouse device, a jog & shuttle, a trackball, a track pad, a touch pad, and a touch screen.

The inputter 850 may receive, for example, information on a cooking object or various pieces of information necessary for the operation of the cooking apparatus 1 such as a selection command for an operation mode of the cooking apparatus 1, a command for starting and/or finishing cooking, a command for changing and/or adjusting a set temperature or a cooking time, and the like.

Depending on an embodiment, the user interface 800 may further include a sound output device, a lighting device, a radio frequency identification (RFID) reader, or an image acquisition device.

The sound output device outputs a voice or a sound to provide information to a user. The sound output device may be embodied using a speaker device and components related thereto.

The lighting device may output light of a certain color or may blink in a certain pattern to provide information to a user. The lighting device may be embodied using, for example, an incandescent lamp, a halogen lamp, a fluorescent lamp, a sodium lamp, a mercury lamp, a fluorescent mercury lamp, a xenon lamp, an arc lighting lamp, a neon tube lamp, an electroluminescent lamp (EL), an LED lamp, a cold cathode fluorescent lamp (CCFL), an external electrode fluorescent lamp (EEFL), or the like.

The RFID reader may communicate with an RFID tag close to the RFID reader to receive information stored in the RFID tag, and may transmit the received information in an electrical signal to the controller 400. The RFID tag may store information on a cooking object. The RFID tag may be built into or attached to a container in which a cooking object is accommodated. The RFID reader receives and transmits the information on the cooking object to the controller 400 to allow the controller 400 to control the operation of the cooking apparatus 1 according to the cooking object.

The RFID reader may be installed at the user interface panel 40 instead of or in addition to the above-described barcode scanner 830.

The image acquisition device may take a picture of an object and may obtain an image of the object. The image acquisition device may take a picture of, for example, a barcode added to a container in which a cooking object is accommodated, characters written on the container, or the like, and may transmit image data to the controller 400. The controller 400 may identify a type, cooking conditions, or the like of the cooking object on the basis of the obtained image data, and may generate control signals for components based on the type, cooking conditions, or the like of the cooking object to allow the cooking apparatus 1 to perform a certain operation.

The image acquisition device may be installed at the user interface panel 40 instead of or in addition to the above-described barcode scanner 830.

Figure 3:
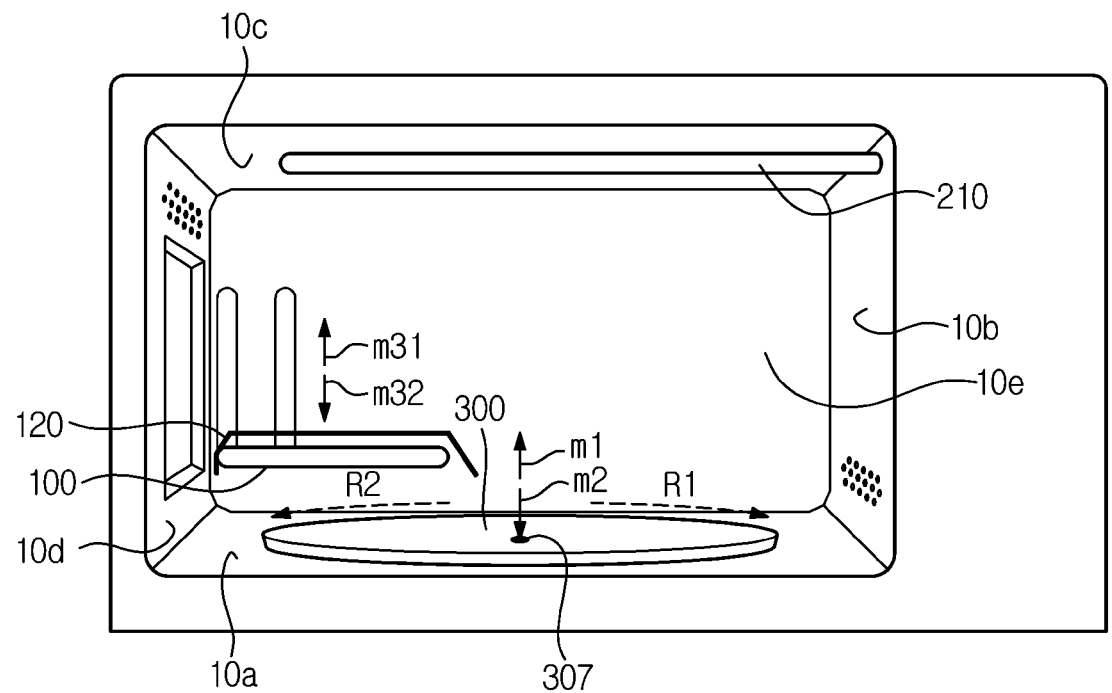
FIG. 3 is a view illustrating one embodiment of an inside of a cooking chamber.

FIG. 3 is a view illustrating one example of an inside of the cooking chamber.

The cooking chamber 10 may be opened and closed by the door 30 as described above and provides a space in which a cooking object such as an ingredient is cooked. Air in the cooking chamber 10 may be heated by heat or microwaves supplied by the first heating portion 100 and/or the second heating portion 200, and accordingly, the cooking object accommodated in the cooking chamber 10 may be heated and cooked.

The cooking chamber 10 may include a plurality of frames 10a to 10e, and one surface thereof is opened and another surface is closed by the plurality of frames 10a to 10e in such a way that a cooking space may be formed in the cooking chamber 10.

As shown in FIG. 3, a rotating plate 300 installed at a bottom frame 10a of the cooking chamber 10 to be rotatable in certain directions R1 and R2 and the first heating portion 100 configured to supply heat to a certain area of the rotating plate 300 may be installed in the cooking chamber 10.

Figure 4:
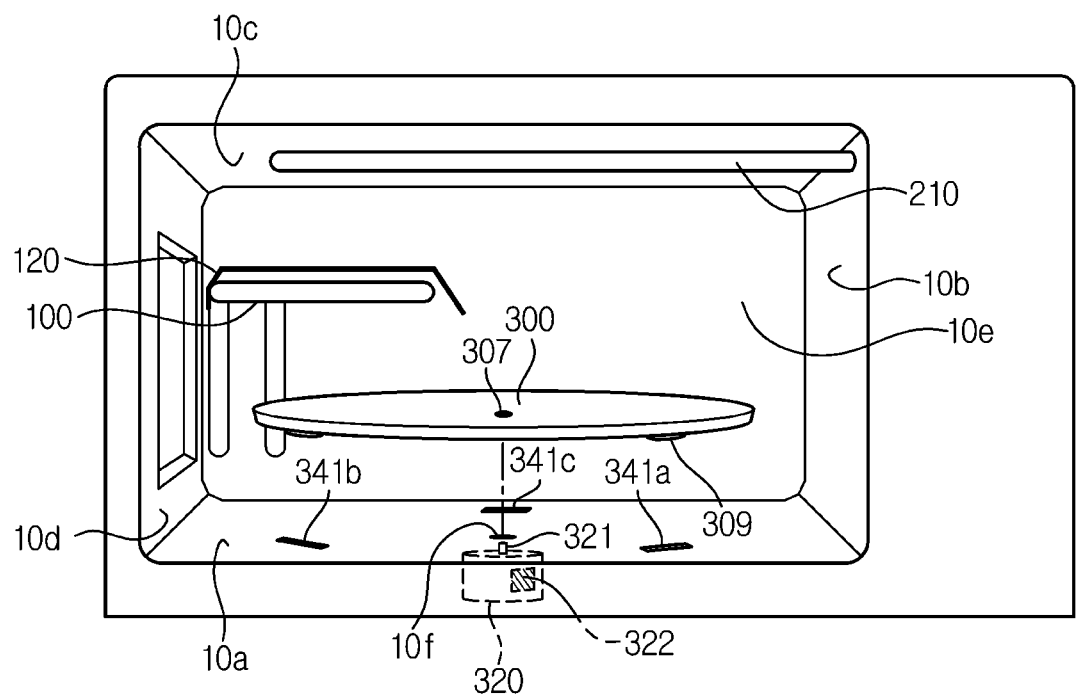
FIG. 4 is a view illustrating one embodiment of a rotating plate.

FIG. 4 is a view illustrating one example of the rotating plate.

Referring to FIGS. 3 and 4, the rotating plate 300 is rotatably installed at the bottom frame 10a of the cooking chamber 10. In this case, the rotating plate 300 may have a circular or an oblong panel shape, and is installed at a bottom end of the cooking chamber 10 to be parallel to the bottom frame 10a.

The rotating plate 300 may rotate at a constant velocity under the control of the controller 400, may increase an angular velocity of rotation and after a certain time decrease the angular velocity of rotation, or may repeatedly accelerate and decelerate rotation. A rotational velocity of the rotating plate 300 may be determined by the controller 400 according to a type and state of a cooking object input through the barcode scanner 830 and/or the inputter 850.

As shown in FIG. 3, a top surface of the rotating plate 300 may be formed to be flat to allow the cooking object to be stably mounted thereon.

Figure 5:
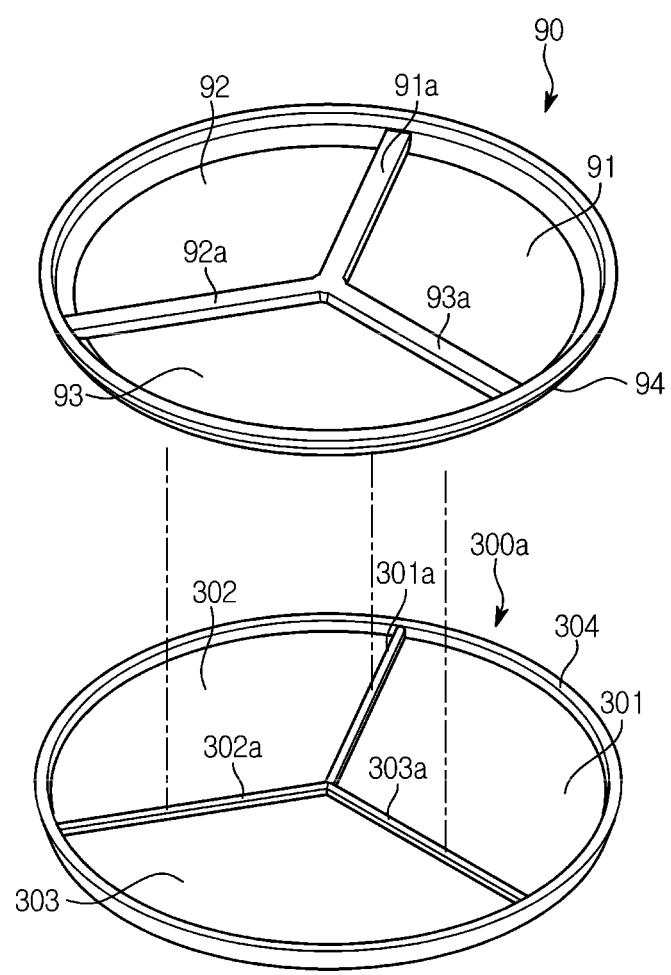
FIG. 5 is a view illustrating another embodiment of the rotating plate.

According to one embodiment, the top surface of the rotating plate 300 may be divided into a plurality of areas 301 to 303 and may include dividing lines that form the areas 301 to 303. The dividing lines may be embodied using grooves or protrusions, or may be embodied by being printed with various paints. The plurality of areas 301 to 303 may include three areas as shown in FIG. 5, or may include two areas. Also, the plurality of areas 301 to 303 may include four or more areas.

A center 307 of the rotating plate 300 is coupled to a rotating shaft member 321 of a rotating plate driver 320, and accordingly, the rotating plate 300 rotates in at least one of the first rotational direction R1 and the second rotational direction R2 based on the center 307 according to driving of the rotating plate driver 320.

The bottom frame 10a may include a hole 10f into which the rotating shaft member 321 of the rotating plate driver 320 is insertable, and the rotating shaft member 321 is exposed in the cooking chamber through the hole 10f and fastened to the center 307 at a bottom surface of the rotating plate 300.

The rotating plate driver 320 is installed at a bottom end of the bottom frame 10a. The rotating plate driver 320 starts being driven under the control of the controller 400, generates torque in the certain directions R1 and R2, and transfers the generated torque to the rotating plate 300. In this case, the rotating plate driver 320 may generate the torque to allow the rotating plate 300 to rotate at the constant velocity or may generate the torque to allow the rotating plate 300 to accelerate and/or decelerate the rotation.

The rotating plate driver 320 may be embodied using a motor. Here, the motor may be embodied using various types of motor usable to rotate of the rotating plate 300 such as a direct-current (DC) motor, an alternating-current (AC) motor, a universal motor, and the like. Also, the motor may be embodied using, for example, a brushless DC (BLDC) motor.

As necessary, the rotating plate driver 320 may transmit power to the rotating shaft member 321 using one or more of various gears, for example, worm gears and the like.

To sense rotation of the rotating plate 300, the cooking apparatus 1 may include an area position sensor 340. The area position sensor 340 may be embodied using, for example, various sensors, a visible light camera, or an infrared camera, or may be embodied using physical means such as a groove formed at the bottom surface of the rotating plate 300 or a top surface of the bottom frame 10a and a protrusion formed at the top surface of the bottom frame 10a or the bottom surface of the rotating plate 300 corresponding to the groove.

For example, the area position sensor 340, as shown in FIG. 4, may be embodied using at least one protrusion 309 formed at the bottom surface of the rotating plate 300 and at least one of pressure sensors 341a to 341c formed at the bottom frame 10a. When the protrusion 309 reaches the at least one of pressure sensors 341a to 341c while the rotating plate 300 rotates, the protrusion 309 compresses the at least one of pressure sensors 341a to 341c such that the at least one of pressure sensors 341a to 341c output electrical signals.

The controller 400 may receive the electrical signals output from the at least one of pressure sensors 341a to 341c and may identify the at least one of pressure sensors 341a to 341c that output the electrical signals on the basis of the received electrical signals to determine which one of the areas 301 to 303 is located at a certain position, for example, a heating position.

Also, depending on embodiments, the cooking apparatus 1 may further include a rotational angle sensor 322 installed to sense a rotational angle of the rotating plate 300. The rotational angle sensor 322 may be installed at the rotating plate driver 320 and may be embodied using an encoder configured to measure a degree of rotation of the rotating plate 300.

The controller 400 may receive an electrical signal output from the rotational angle sensor 322, may determine the degree of rotation of the rotating plate 300 by sensing the rotational angle of the rotating plate 300, and may determine which one of the areas 301 to 303 is located at the certain position on the basis thereof. In this case, the controller 400 may further use the area position sensor 340 to determine an initial position of the rotating plate 300 for sensing the rotational angle.

Figure 8:
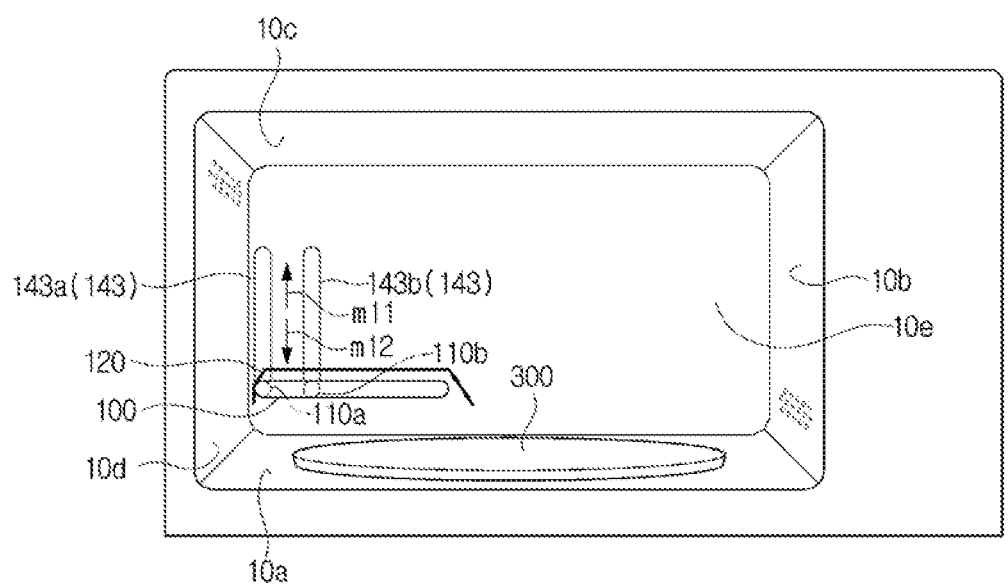
FIG. 8 is a first view illustrating a first embodiment of a first heating portion driver.

Also, depending on embodiments, the rotating plate 300 may be provided to be movable in at least one of an upward direction m1 and a downward direction m2, as shown in FIG. 3. For this, a motor (not shown) and various components configured to convert a rotational motion into a rectilinear motion may be provided at a bottom end of the rotating plate 300. Here, the various components may include, for example, a rotating bar 146 including a spiral formed thereon and a guide bar 148, as shown in FIG. 8, and may further include components such as various gears and the like.

Depending on an embodiment, the rotating plate 300 may be controlled to move in the upward direction m1 to be adequately heated by a first heat source 110 of the first heating portion 100 when at least one of the plurality of areas 301 to 303 approaches the heating position. Also, the rotating plate 300 may be controlled to move in the downward direction m2 when it is unnecessary to separately heat each of the areas 301 to 303. Vertical movement of the rotating plate 300 may be controlled by the controller 400.

FIG. 5 is a view illustrating another example of the rotating plate.

Referring to FIG. 5, a rotating plate 300a according to another embodiment may include mounting protrusions 301a, 302a, and 303a and a rotating plate partition 304 formed on a top surface thereof to allow the container 90 to be mounted thereon. In this case, the protrusion 309 formed at the bottom surface of the rotating plate 300 may be installed at a certain position of a bottom surface of the rotating plate 300 depending on positions of the mounting protrusions 301a, 302a, and 303a. For example, the protrusion 309 formed at the bottom surface of the rotating plate 300 may be formed at a part of a surface opposite to one surface at which a first mounting protrusion 301a is formed. Accordingly, the controller 400 may recognize which one of a plurality of such mounting protrusions 301a, 302a, and 303a is located at or passes through a particular one of the pressure sensors 341a to 341c and may accordingly determine positions of the plurality of areas 301 to 303 at a top end of the rotating plate 300.

The container 90 may include one or more protrusions 91a, 92a, and 93a provided to be recessed from a bottom surface of the container 90 and to protrude from a top surface of the container 90. The protrusions 91a, 92a, and 93a may divide the top surface of the container 90 into a plurality of areas 91, 92, and 93. Also, the container 90 may include a partition 94 formed to prevent separation of a cooking object and the like.

The mounting protrusions 301a, 302a, and 303a are provided to allow recessed areas formed opposite the protrusions 91a, 92a, and 93a of the container 90 to be mounted and inserted therein. The rotating plate partition 304 is provided to allow the partition 94 of the container 90 to come into contact therewith and be inserted thereinto.

Accordingly, the container 90 may be adequately mounted on the rotating plate 300a and allows the areas 91, 92, and 93 of the container 90 to be mounted corresponding to the areas 301 to 303 on the rotating plate 300a.

The first heating portion 100 may include the first heat source 110.

The first heat source 110 may convert externally applied electrical energy into heat energy, and may emit the heat generated thereby toward a part of or an entirety of a space in the cooking chamber 10.

The first heat source 110 may be embodied using at least one heater configured to emit Joule's heating by using electrical resistance. Intensity of the heat generated by the heater may correspond to a level of an applied current. Here, the heater may be embodied using various types and shapes of heater such as a sheathe heater, a ceramic heater, a quartz heater, a plain-shaped heater, and the like.

Figure 6A:
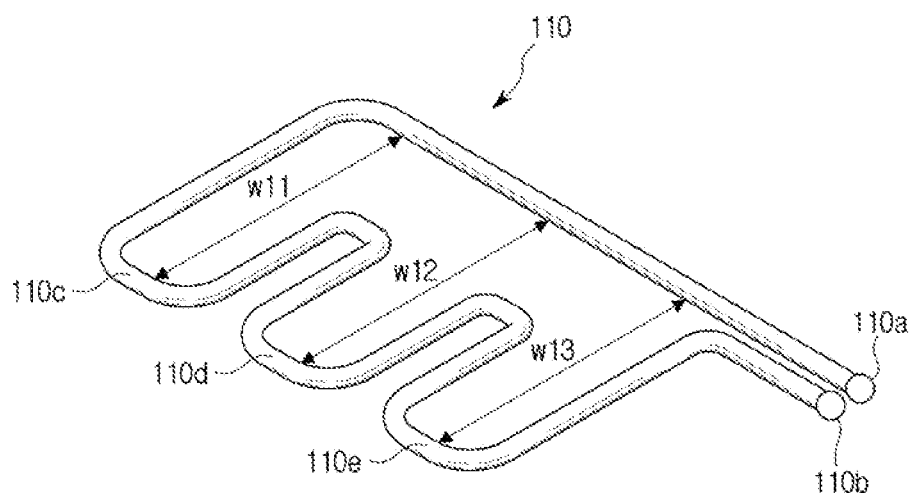
FIG. 6A is a view illustrating a first embodiment of a first heat source.
Figure 6B:
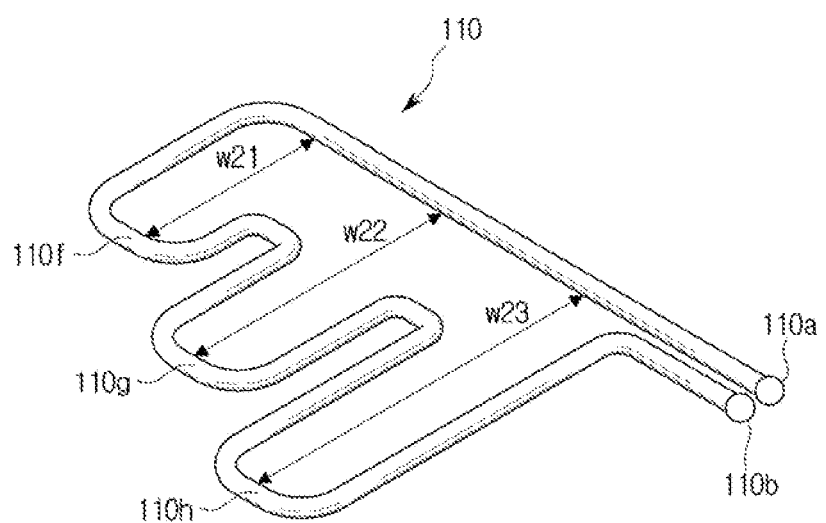
FIG. 6B is a view illustrating a second embodiment of the first heat source.
Figure 6C:
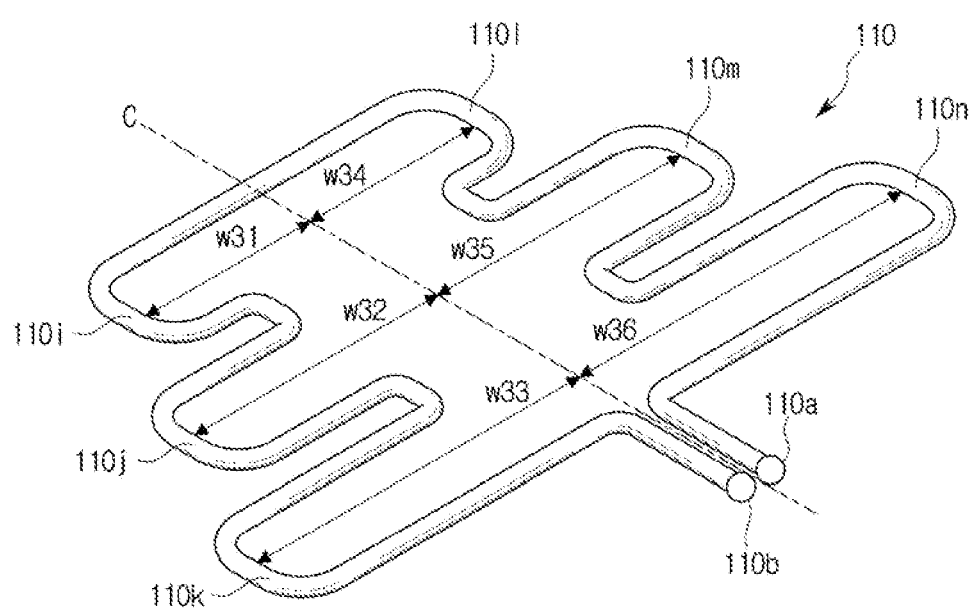
FIG. 6C is a view illustrating a third embodiment of the first heat source.

FIG. 6A is a view illustrating a first embodiment of the first heat source, and FIG. 6B is a view illustrating a second embodiment of the first heat source. FIG. 6C is a view illustrating a third embodiment of the first heat source.

The first heat source 110, as shown in FIGS. 6A to 6C, may be embodied using a heating coil having various shapes depending on embodiments For example, the first heat source 110 may be embodied using a heating coil designed to be bent a plurality of times to have a zigzag shape.

Referring to FIG. 6A, according to one embodiment, the first heat source 110 may include a plurality of curves 110c to 110e formed by bending a heating coil at least four times. Any one of the curves 110c to 110e may be generally formed by bending the heating coil to form a square, rectangular, trapezoidal, or lozenge shape. In this case, widths w11 to w13 of the curves 110c to 110e may be the same.

Referring to FIG. 6B, according to another embodiment, the first heat source 110 may include a plurality of curves 110f to 100h formed by bending a heating coil at least four times, and each of the curves 110f to 100h may generally have a square, rectangular, trapezoidal, or lozenge shape.

In this case, widths w21 to w23 of the curves 110f to 110h may be different. For example, the width w21 of the first curve 110f which is farthest from both ends 110a and 110b of the first heat source 110 may be smaller than the widths w22 and w23 of the other curves 110g and 110h. The width w23 of the third curve 110h which is closest to the both of the ends 110a and 110b of the first heat source 110 may be larger than the widths w21 and w22 of the other curves 110f and 110g. Also, the width w22 of the second curve 110g disposed between the first curve 110f and the third curve 110h may be larger than the width w21 of the first curve 110f and smaller than the width w23 of the third curve 110h.

Accordingly, when viewed as a whole, the first heat source 110 may generally have a right-angled triangle or trapezoidal shape.

Referring to FIG. 6C, according to still another embodiment, the first heat source 110 includes a plurality of curves 110i to 110n formed by bending a heating coil at least four times, and some curves 110i to 110k among of the plurality of curves 110i to 110n may be disposed to be symmetrical to the other curves 110l to 110n based on a central line c between both of the ends 110a and 110b of the first heat source 110. In this case, corresponding curves, for example, the fourth curve 110i and the seventh curve 110l, the fifth curve 110j and the eighth curve 110m, and the sixth curve 110k and the ninth curve 110n may be provided to have mutually symmetrical shapes.

Each of the curves 110i to 110n may generally have a square, rectangular, trapezoidal, or a lozenge shape. In this case, widths w31 to w36 of the curves 110i to 110n may be the same or different, as shown in FIG. 6C.

For example, the widths w31 and w34 of the fourth curve 110i and the seventh curve 110l farthest from both of the ends 110a and 110b of the first heat source 110 may be smaller than the widths w32, w33, w35, and w36 of the other curves 110j, 110k, 110m, and 110n and the widths w33 and w36 of the sixth curve 110k and the ninth curve 110n closest to both of the ends 110a and 110b of the first heat source 110 may be larger than the widths w31, w32, w34, and w35 of the other curves 110i, 110j, 110l, and 110m. Also, the width w32 of the fifth curve 110j disposed between the fourth curve 110i and the sixth curve 110k may be larger than the width w31 of the fourth curve 110i and smaller than the width w33 of the sixth curve 110k. Likewise, the width w35 of the eighth curve 110m disposed between the seventh curve 110l and the ninth curve 110n may be larger than the width w34 of the seventh curve 110l and smaller than the width w36 of the ninth curve 110n.

Accordingly, when viewed as a whole, the first heat source 110 may generally have a regular triangle, isosceles triangle, or trapezoidal shape.

Above, various shapes of the first heat source 110 have been described, but a shape of the first heat source 110 is not limited thereto. For example, the first heat source 110 may have a circular, oblong, or quadrangular shape, or may have a shape of a plurality of concentric circles. Also, the first heat source 110 may have a fan shape depending on an embodiment.

One end 110a and the other end 110b of the first heat source 110 are electrically connected to an external power supply 600 (refer to FIG. 16) to allow currents supplied from the power supply 600 to flow through the first heat source 110. The current supplied from the power supply 600 flows into any one of the one end 110a and the other end 110b of the first heat source 110, and the current which flows through the first heat source 110 is discharged through the other thereof to the power supply 600.

Figure 6D:
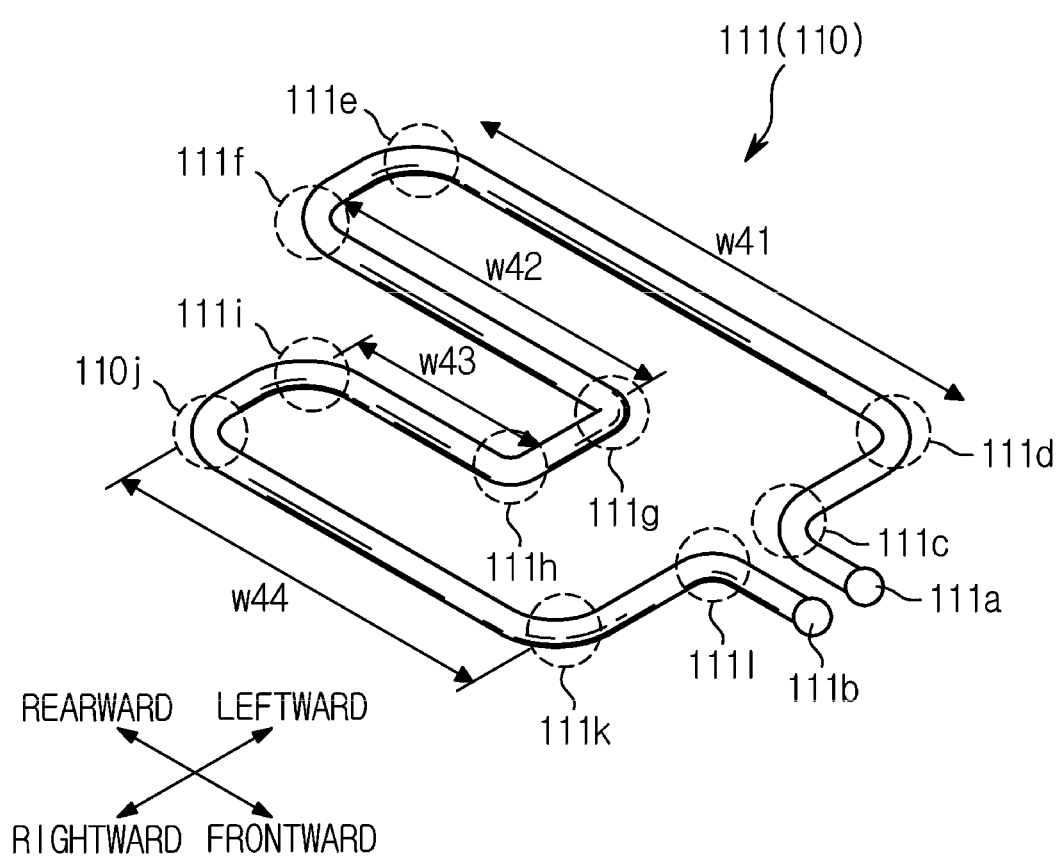
FIG. 6D is a first view illustrating a fourth embodiment of the first heat source.
Figure 6E:
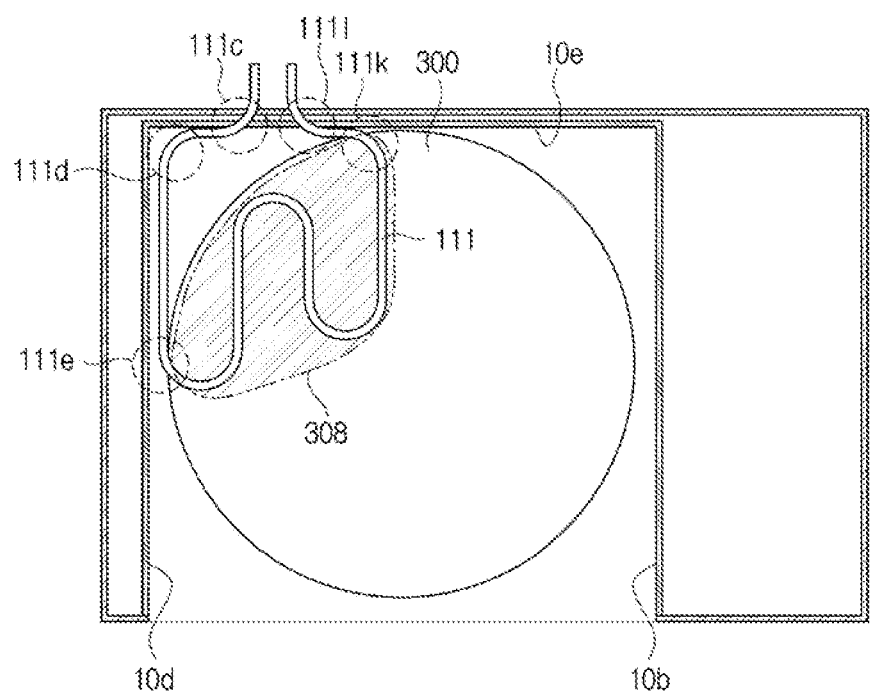
FIG. 6E is a second view illustrating the fourth embodiment of the first heat source.

FIG. 6D is a first view illustrating a fourth embodiment of the first heat source, and FIG. 6E is a second view illustrating the fourth embodiment of the first heat source, and the views illustrate the inside of the cooking chamber 10 of the cooking apparatus 1 when viewed from above. In FIG. 6D, a downward direction of a right side of the drawing is referred to as the frontward direction, an upward direction of the left side of the drawing is referred to as the rearward direction, an upward direction of the right side of the drawing is referred to as the leftward direction, and a downward direction of the right side of the drawing is referred to as the rightward direction. However, this is for convenience of description and it should be obvious that the directions may be arbitrarily defined by a selection of one of ordinary skill in the art.

As shown in FIG. 6D, a first heat source 111 according to the fourth embodiment may be formed of a heating coil bent a plurality of times.

In detail, the heating coil of the first heat source 111 is sequentially curved leftward at a first curve point 111c and curved rearward at a second curve point 111d. The heating coil is curved rightward at a third curve point 111e, curved frontward at a fourth curve point 111f, and curved rightward again at a fifth curve point 111g. The fifth curve point 111g is located between the fourth curve point 111f and the one end 111a. The heating coil is curved rearward at a sixth curve point 111h and curved rightward at a seventh curve point 111i. According to one embodiment, a distance w43 between the sixth curve point 111h and the seventh curve point 111i may be provided to be shorter than a distance w42 between the fourth curve point 111f and the fifth curve point 111g. The heating coil is curved frontward at an eighth curve point 111j and curved leftward at a ninth curve point 111k. According to one embodiment, a distance w44 between the eighth curve point 111j and the ninth curve point 111k may be provided to be shorter than a distance w41 between the second curve point 111d and the third curve point 111e. The heating coil is curved frontward at a tenth curve point 111l and then the other end 111b is formed.

Since the first heat source 111 is formed as described above, the first heat source 111 may be formed to be approximately similar to a shape in which one surface of a quadrangle is concavely recessed inward.

Referring to FIG. 6E, the first heat source 111 may be installed at the rear surface frame 10e to allow a part approximately between the third curve point 111e and the ninth curve point 111k to be disposed at a top end of the rotating plate 300. In this case, a part of the first heat source 111 between the second curve point 111d and the third curve point 111e may be installed to be adjacent to or to come into contact with a side frame 10d. Also, a part of the first heat source 111 between the first curve point 111c and the second curve point 111d and a part between the ninth curve point 111k and the tenth curve point 111l may be installed to be adjacent to or to come into contact with the rear surface frame 10e.

When the first heat source 111 is installed as described, one part of the first heat source 111, for example, one area 308 of the rotating plate 300 located at a bottom end of the part between the third curve point 111e and the ninth curve point 111k, may be heated according to an operation of the first heat source 111. The one area 308 of the rotating plate 300 which is heated may have an approximately triangular shape according to a shape of the first heat source 111, as shown in FIG. 6E.

Accordingly, since the one area 308 of the rotating plate 300 which has an approximately triangular shape is heated by the first heat source 111 and the other areas are not or hardly heated by the first heat source 111, only the one area 308 of the rotating plate 300 and a cooking object and/or a container disposed in the one area 308 may be mainly heated.

The one end 111a and the other end 111b of the first heat source 111 are provided to be electrically connected to the power supply 600, as described above, to allow currents to flow through the heating coil.

The first heating portion 100 may be installed on at least one of the sides 10b, 10d, and 10e of the cooking chamber 10 to apply heat to a partial area of the rotating plate 300 or

300*a*. The first heating portion 100 may further include a heat reflector 120 in addition to the first heat source 110 to allow heat emitted from the first heat source 110 to be focused in a certain direction.

The heat reflector 120 may reflect heat which is not transferred toward the bottom frame 10*a* among the heat emitted from the first heat source 110 to transfer the heat which is not transferred to the bottom frame 10*a* in a direction of the bottom frame 10*a*, that is, in a direction in which the rotating plate 300 is located. For example, the heat reflector 120 may reflect heat transferred to the top frame 10*c* toward the bottom frame 10*a*.

The heat reflector 120 may be embodied as a flat panel having a triangular, quadrangular, circular, oblong, or any shape selectable by a designer. The first heat source 110 may be spaced a certain distance apart from the heat reflector 120, and may be formed between the heat reflector 120 and the bottom frame 10*a*.

According to one embodiment, a part curved toward the bottom frame 10*a* at a certain angle may be formed on at least one of four boundaries of the flat panel as shown in FIG. 3.

The first heat source 110 is disposed inside the curved part. In this case, a boundary near the curved part is positioned closer to the bottom frame 10*a* than the first heat source 110 to allow the first heat source 110 to be completely disposed thereinside.

Figure 7:
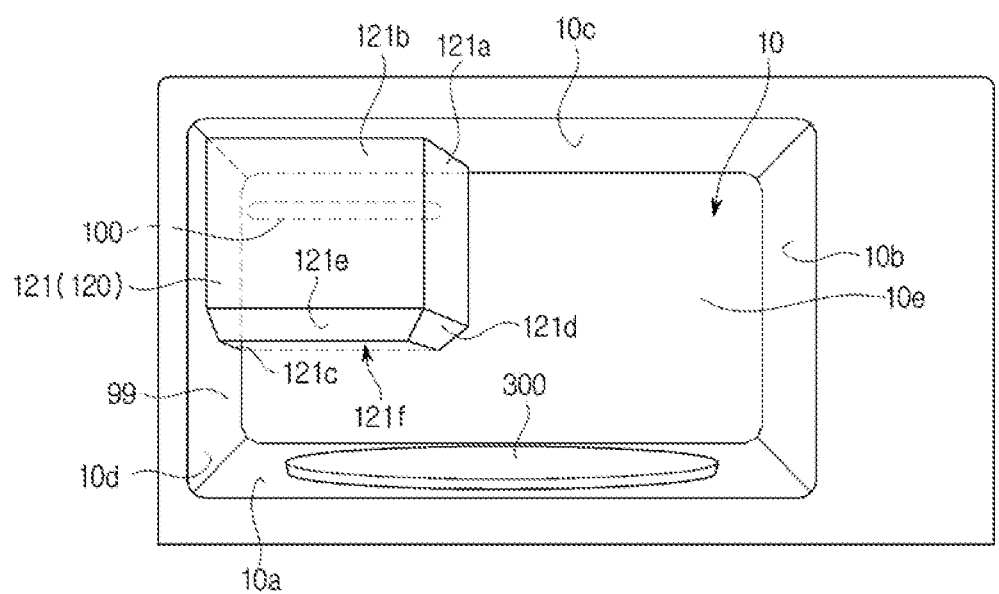
FIG. 7 is a view illustrating one embodiment of a reflector.

According to one embodiment, the heat reflector 120 may have a box shape with an open bottom, as shown in FIG. 7.

The heat reflector 120 in a box shape includes a plurality of heat reflector frames 121*a* to 121*c*. One heat reflector frame 121*c* may be installed to be in contact with at least one of the side frames 10*b* and 10*d* or the rear surface frame 10*e* of the cooking chamber 10 and the two other heat reflector frames 121*a* and 121*b* may be exposed inside the cooking chamber 10. In this case, at least one side frame of the cooking chamber 10 on which the heat reflector frame 121*c* is installed may include, for example, the side frame 10*d* facing the one side 10*b* which divides the cooking chamber 10 and the electronic component chamber.

Also, an opening 121*f* may be installed below the plurality of heat reflector frames 121*a* to 121*c*. Heat emitted from the first heating portion 100 formed inside the plurality of heat reflector frames 121*a* to 121*c* is transferred downward through the opening 121*f* and may reach at least one of the areas 301 to 303 of the rotating plate 300.

According to one embodiment, a bottom end of at least one of the plurality of heat reflector frames 121*a* to 121*c* may include inclined portions 121*d* and 121*e* formed to be inclined toward the opening 121*f*, as shown in FIG. 7. Due to the inclined portions 121*d* and 121*e*, a size of the opening 121*f* may be more reduced. The heat emitted from the first heating portion 100 is reflected by the inclined portions 121*d* and 121*e*, moves toward the opening 121*f*, and is then discharged outward through the opening 121*f*. Accordingly, the heat is more intensively transferred to a narrow range. Accordingly, stronger heat may be incident on a more reduced range in at least one of the areas 301 to 303 of the rotating plate 300, and the particular one of the areas 301 to 303 of the rotating plate 300 and/or an ingredient or a container disposed on the particular one of the areas 301 to 303 may be more intensively heated.

The heat reflector 120 in a box shape may be formed of a material capable of adequately reflecting heat and may be embodied using, for example, stainless steel.

A detailed structure and operation of the second heating portion 200 will be described below.

According to one embodiment, the cooking apparatus 1 may include the second heating portion 200 configured to supply heat to an entire space of the cooking chamber 10.

The second heating portion 200 may be embodied using a second heat source 210 which emits heat caused by electrical resistance or may be embodied using a microwave emitter 230 (refer to FIG. 16) which heats a cooking object in the cooking chamber 10 by emitting microwaves into the cooking chamber 10.

The second heat source 210 may be installed in the cooking chamber 10.

The second heat source 210 of the second heating portion 200, according to one embodiment, may be installed to be adjacent to the top frame 10*c* of the cooking chamber 10, as shown in FIG. 3. Depending on embodiments, the second heat source 210 may be installed to be adjacent to the side frames 10*b* and 10*d* or the rear surface frame 10*e* or may be installed to be adjacent to all of the top frame 10*c*, the side frames 10*b* and 10*d*, and the rear surface frame 10*e*.

The second heat source 210 of the second heating portion 200 may emit heat according to an operation of the controller 400 and may be provided to allow the heat emitted from the second heat source 210 to be incident on all or most of the top surface of the rotating plate 300. Accordingly, the second heating portion 200 may heat most the cooking object 9 (refer to FIG. 16) disposed on the rotating plate 300.

The second heat source 210 may have the same shape as that of the first heat source 110 or may have a different shape. For example, the first heat source 110 may be manufactured to be smaller than the second heat source 210 to emit heat toward a part of an internal space of the cooking chamber 10. Also, the second heat source 210 may be formed to be larger than the first heat source 110 to emit heat into the whole internal space of the cooking chamber 10 and may have a larger number of curve points than those of the first heat source 110.

A heater used as the second heat source 210 may be the same type of heater used as the first heat source 110 or may be a different type of heater.

According to one embodiment, a reflector may be further installed on the top frame 10*c*. The reflector reflects the heat emitted from the second heat source 210 and transferred to the top frame 10*c* to be transferred toward the bottom frame 10*a*, that is, toward the rotating plate 300. The reflector may include an upwardly recessed part, and the heat reflected by the recessed part may more intensively move toward a center of the internal space of the cooking chamber 10.

The microwave emitter 230 will be described below.

Hereinafter, several embodiments of first heating portion drivers 140, 160, and 180 for driving the first heating portion 100 will be described.

Figure 9:
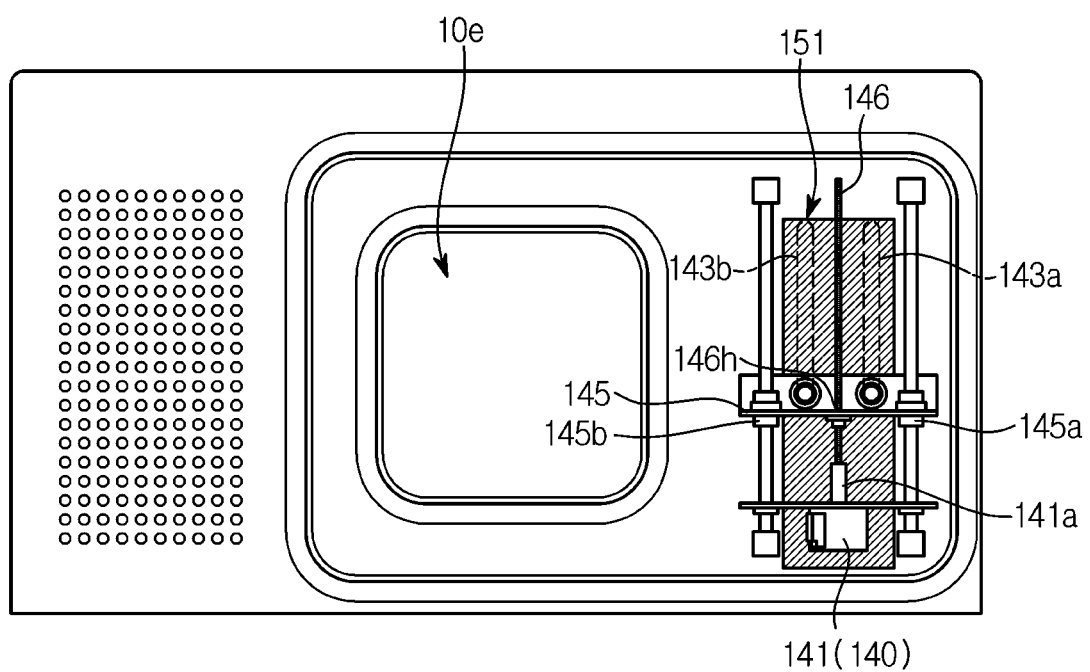
FIG. 9 is a second view illustrating the first embodiment of the first heating portion driver.
Figure 10:
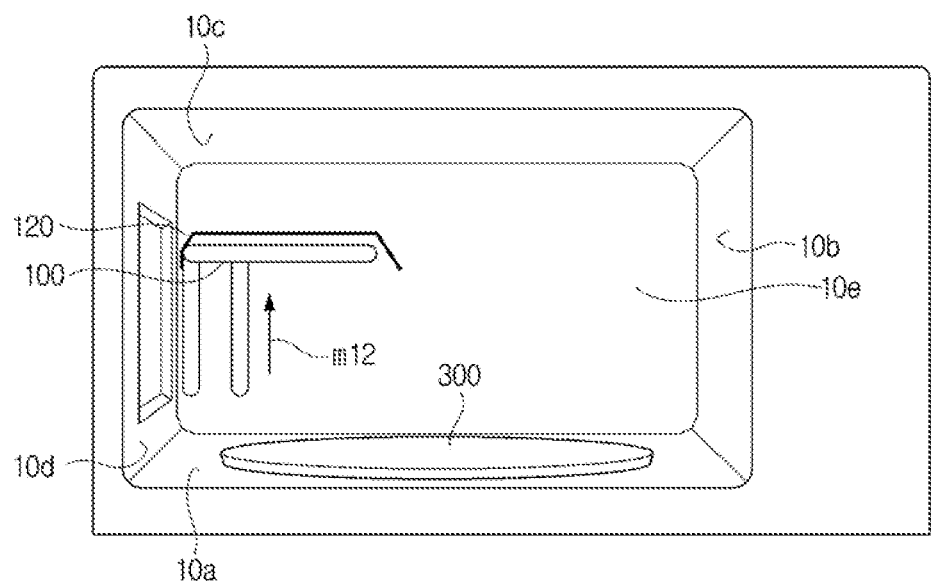
FIG. 10 is a first view illustrating an operation of the first heating portion driver according to a third embodiment.
Figure 11:
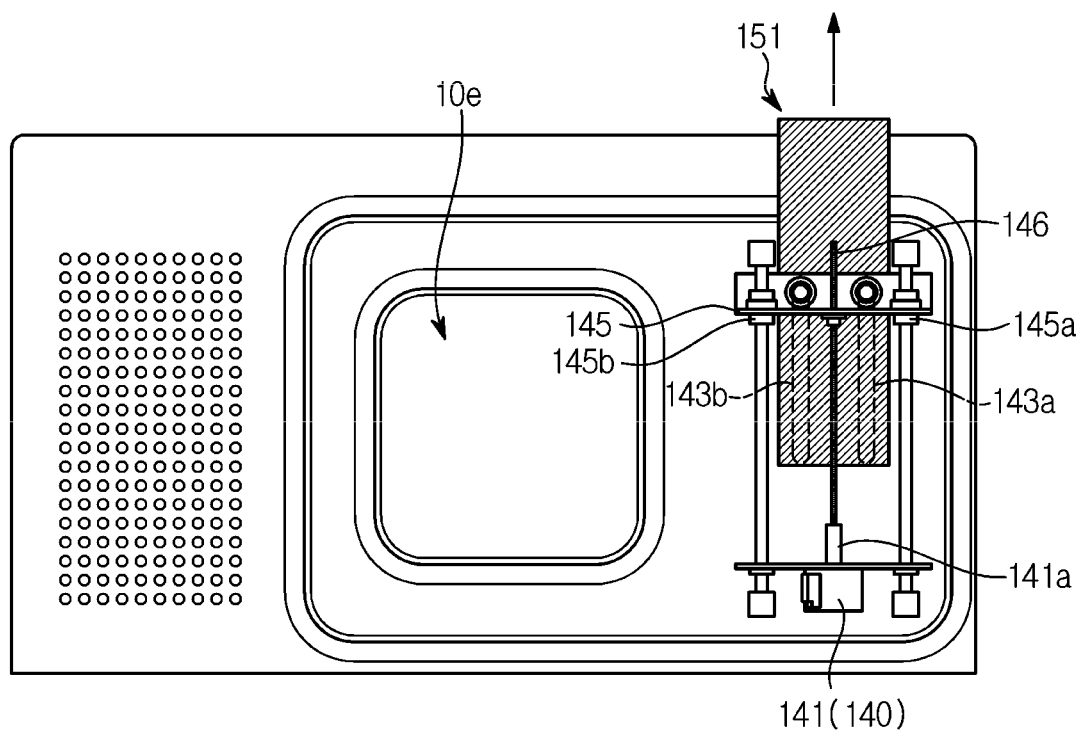
FIG. 11 is a second view illustrating the operation of the first heating portion driver according to the third embodiment.

FIG. 8 is a first view illustrating a first embodiment of the first heating portion driver, and FIG. 9 is a second view illustrating the first embodiment of the first heating portion driver. FIG. 10 is a first view illustrating an operation of the first heating portion driver according to a third embodiment, and FIG. 11 is a second view illustrating the operation of the first heating portion driver according to the third embodiment.

Referring to FIGS. 8 and 9, according to one embodiment, the first heating portion driver 140 may include a driving motor 141, a slit 143, a heat source supporter 145, the rotating bar 146, and the guide bar 148.

The driving motor 141 is installed on a rear surface of the rear surface frame 10*e* and provides torque to the rotating bar 146 to allow the heat source supporter 145 to be movable in at least one of a vertically upward direction m11 and a vertically downward direction m12. The driving motor 141 may be embodied using a BLDC motor and the like capable of changing a rotational direction.

The rotating bar 146 is installed on the rear surface of the rear surface frame 10e and is provided to be connected to a rotating member 141a of the driving motor 141 to rotate according to rotation of the rotating member 141a according to operation of the driving motor 141. A spiral is formed on an outer perimeter of the rotating bar 146.

The heat source supporter 145 is installed on the rear surface of the rear surface frame 10e and is coupled to the first heat source 110 to support the first heat source 110. Also, the heat source supporter 145 also allows both of the ends 110a and 110b of the first heat source 110 to be electrically connected to an external conducting wire. Accordingly, power supplied from the power supply 600 may be transferred to the first heat source 110.

A hole 146h with a spiral formed thereinside corresponding to the spiral of the rotating bar 146 may be installed at a middle of the heat source supporter 145. A rotational motion of the rotating bar 146 is converted into a rectilinear motion by the rotating bar 146 and the spiral formed in the hole 146h.

At least one slit 143 may be provided at one position of the rear surface frame 10e, and the first heat source 110 may be coupled with and installed at the heat source supporter 145 through the slit 143. Since the first heat source 110 has the two ends 110a and 110b, two slits 143a and 143b may be installed at the rear surface frame 10e.

The two slits 143a and 143b may be formed at the rear surface frame 10e to extend downward from a top of the rear surface frame 10e, as shown in FIGS. 8 and 10, to allow the first heat source 110 to be movable in at least one of the upward direction m11 and the downward direction m12. The first heat source 110 moves along the two slits 143a and 143b in at least one of the upward direction m11 and the downward direction m12 due to the driving motor 141, the rotating bar 146, and the heat source supporter 145.

The two slits 143a and 143b may be formed by cutting parts of the rear surface frame 10e, or may be previously formed at the rear surface frame 10e when the rear surface frame 10e is manufactured.

According to one embodiment, a shielding portion 151 installed for shielding against electromagnetic waves which pass through the slits 143 and are emitted outward may be further installed at the heat source supporter 145. The shielding portion 151 may have a flat panel shape and may be designed to allow a middle of the flat panel to be installed at the heat source supporter 145 according to one embodiment. The shielding portion 151 may be embodied using, for example, various components or materials capable of blocking electromagnetic waves such as a metal mesh net and the like.

The shielding portion 151 may be fixed to the heat source supporter 145, as shown in FIG. 11, and accordingly may be provided to be movable in at least one of the upward direction m11 and the downward direction m12 corresponding to the movements of the heat source supporter 145 in the upward direction m11 and the downward direction m12.

The guide bar 148 (148a, 148b) is provided to pass through at least one of through holes 145a and 145b provided at the heat source supporter 145 to allow the heat source supporter 145 to be movable in the vertically upward direction m11 and the vertically downward direction m12 without deviation. The guide bar 148 is fixed to and installed at the rear surface of the rear surface frame 10e.

Although one example in which the first heating portion driver 140 is installed at the rear surface frame 10e has been described above, an installation position of the first heating portion driver 140 is not limited thereto. Like or partially deviating from the above-described embodiment, the first heating portion driver 140 may be installed at the other sides 10b and 10d.

Through the above-described structure, the first heating portion 100 may move in the upward direction m11 and the downward direction m12, and accordingly may move to a target position L1 and an initial position L2. Here, the target position L1 is a position at which the first heating portion 100 may adequately supply heat to the rotating plate 300 when cooking by the first heating portion 100 is necessary, and the initial position L2 refers to a position at which the first heating portion 100 is disposed when cooking by the first heating portion 100 is unnecessary.

Figure 12:
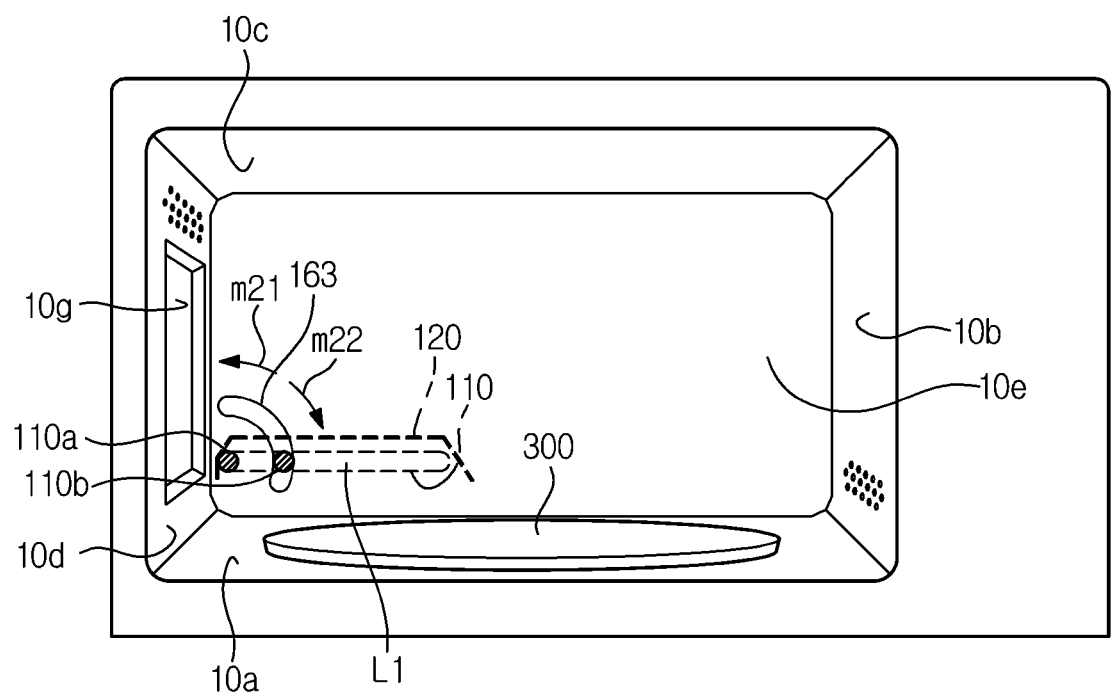
FIG. 12 is a first view illustrating a second embodiment of the first heating portion driver.
Figure 13:
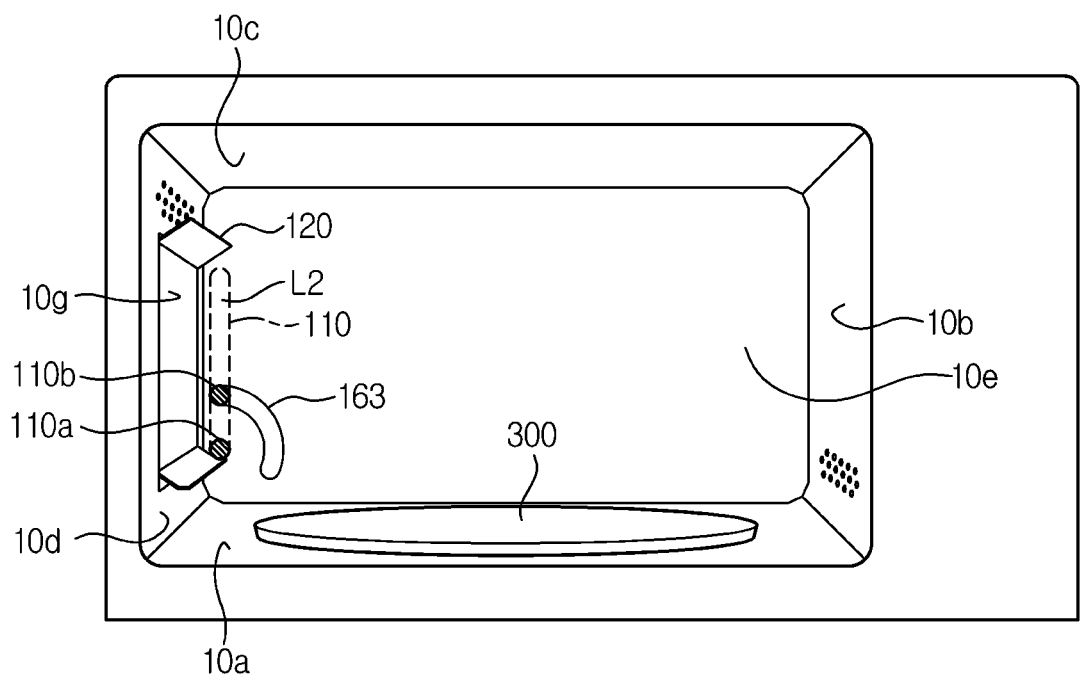
FIG. 13 is a second view illustrating the second embodiment of the first heating portion driver.

FIG. 12 is a first view illustrating a second embodiment of a first heating portion driver, and FIG. 13 is a second view illustrating the second embodiment of the first heating portion driver.

As shown in FIGS. 12 and 13, the first heating portion driver 160 may include a curved slit 163 formed at the rear surface of the rear surface frame 10e, and may further include components such as a driving motor (not shown), various gears (not shown), and the like installed at the rear surface of the rear surface frame 10e.

A rotating shaft of the driving motor may be close to or be in contact with the one end 110a of the heat source 110 of the first heating portion 100, and may be flush with heat wires of the one end 110a of the heat source 110. When the driving motor rotates, the heat source 110 of the first heating portion 100 may pivot around the rotating shaft due to a rotating shaft member and/or various gears provided at the rotating shaft, and both of the ends 110a and 110b of the heat source 110 may move along the curved slit 163. Accordingly, the first heating portion 100 may rotate in certain directions m21 and m22, as shown in FIGS. 12 and 13. In other words, the first heating portion 100 may pivot to move to at least one of the initial position L2 and the target position L1 in contact with the one side 10d. Here, the target position L1 is provided close to the rotating plate 300.

Both of the ends 110a and 110b of the heat source 110 may be exposed to a rear surface of the cooking chamber 10 through the curved slit 163, and accordingly may be connected to an external conducting wire or circuit and the like to be connected to the power supply 600 or a first heat source switching portion 199.

Depending on embodiments, a shielding portion (not shown) capable of blocking electromagnetic waves emitted outward through the curved slit 163 may be further provided at the rear surface of the rear surface frame 10e at which the curved slit 163 is formed.

According to one embodiment, a mounting surface 10g on which the heat reflector 120 of the first heating portion 100 is mountable may be formed on the one side 10d adjacent to the initial position L2. The mounting surface 10g is provided corresponding to a shape of the heat reflector 120.

Figure 14A:
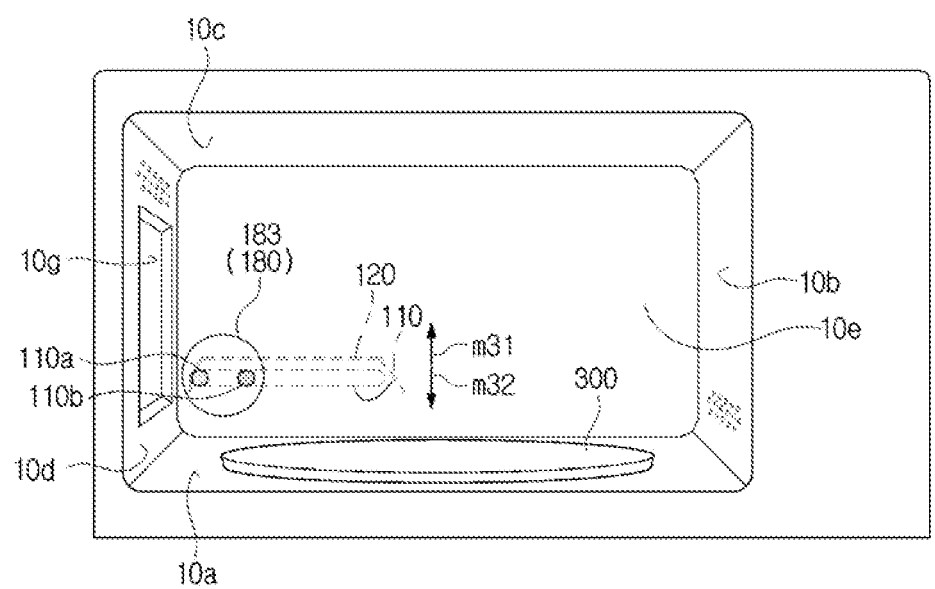
FIG. 14A is a first view illustrating a third embodiment of the first heating portion driver.
Figure 14B:
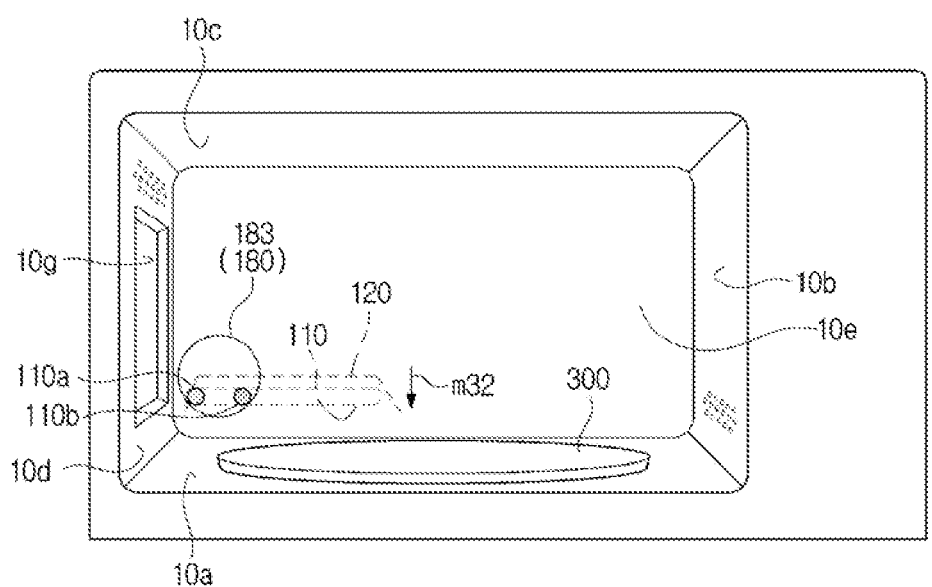
FIG. 14B is a second view illustrating the third embodiment of the first heating portion driver.
Figure 14C:
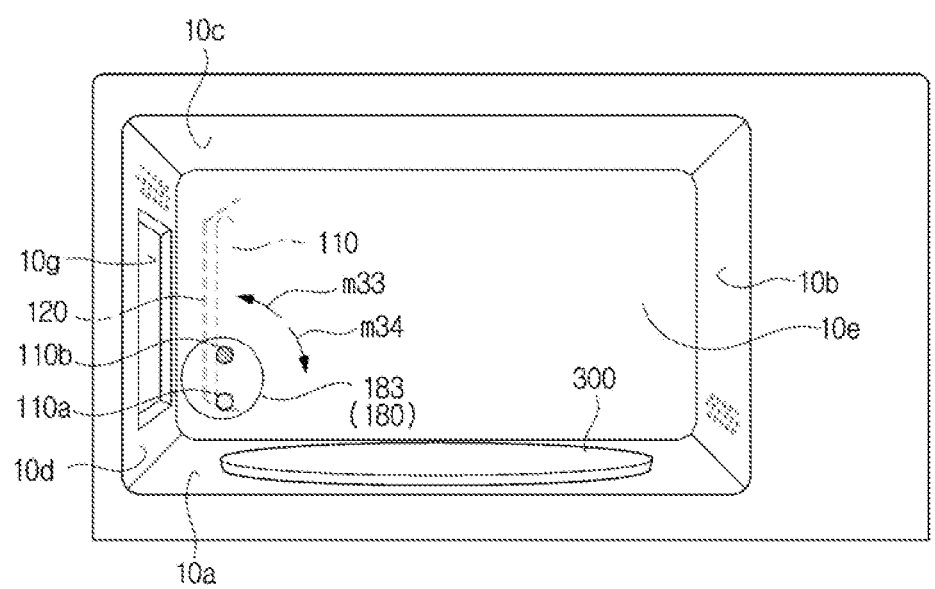
FIG. 14C is a third view illustrating the third embodiment of the first heating portion driver.

FIG. 14A is a first view illustrating a third embodiment of the first heating portion driver, FIG. 14B is a second view illustrating the third embodiment of the first heating portion driver, and FIG. 14C is a third view illustrating the third embodiment of the first heating portion driver.

As shown in FIGS. 14A to 14C, a first heating portion driver 180 may include a circular slit 183 formed at the rear surface of the rear surface frame 10e, and may further include one or more a driving motor (not shown), an actuator, various gears (not shown) and the like installed at the rear surface of the rear surface frame 10e.

Due to at least one of the driving motor and the actuator being operated, both of the ends 110a and 110b of the heat source 110 of the first heating portion 100 may move in the circular slit 183. In this case, both of the ends 110a and 110b of the heat source 110 may move in an upward direction m31 or a downward direction m32, as shown in FIGS. 14A and 14B, or may rotate, as shown in FIG. 14C.

Both of the ends 110a and 110b of the heat source 110 may be exposed to the rear surface of the cooking chamber 10 through the circular slit 183, and accordingly may be connected to an external conducting wire or circuit and the like to be connected to the power supply 600 or a first heating source switching portion 199.

Depending on an embodiment, a shielding portion (not shown) may be further provided at the rear surface of the rear surface frame 10e at which the slit 183 is formed.

Like the above-described second embodiment, the mounting surface 10g on which the heat reflector 120 of the first heating portion 100 is mountable may be formed on the one side 10d adjacent to the initial position L2. The mounting surface 10g is provided corresponding to the shape of the heat reflector 120.

Although only a case in which the slit 183 has a circular shape is shown in FIGS. 14A to 14C, the shape of the slit 183 is not limited thereto, and the slit 183 may have a quadrangular or oblong shape.

Figure 15:
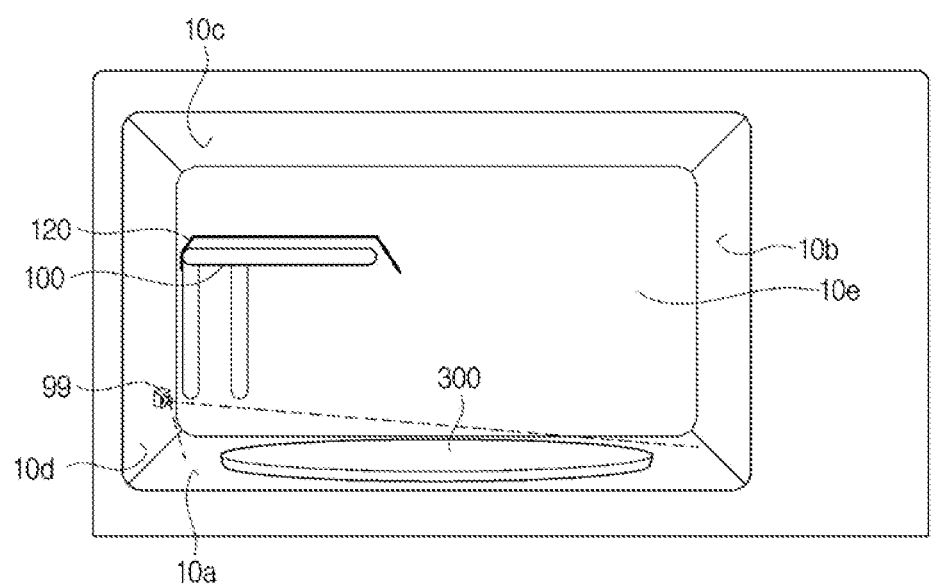
FIG. 15 is a view illustrating a temperature sensor according to one embodiment.

FIG. 15 is a view illustrating a temperature sensor according to one embodiment.

As shown in FIG. 15, a temperature sensor 99 is installed near a heating position or the target position L1 to measure a temperature of at least one of the rotating plate 300, the container 90 mounted on the rotating plate 300, and the cooking object 9 accommodated in the container 90.

The temperature sensor 99 may be embodied using an infrared sensor and the like.

When the temperature of at least one of the rotating plate 300, the container 90 mounted on the rotating plate 300, and the cooking object 9 accommodated in the container 90 is measured, the temperature sensor 99 may transmit a result of the measurement to the controller 400. The controller 400 may allow the first heating portion 100 to continue operation or stop the operation depending on a measured temperature and a preset target temperature. Here, the target temperature refers to a temperature at which a cooking object is adequately cooked.

Hereinafter, referring to FIGS. 16 to 23, one embodiment of the operation of the cooking apparatus will be described.

FIG. 16 is a control block diagram illustrating one example of the cooking apparatus.

Referring to FIG. 16, the cooking apparatus 1 may include the cooking chamber 10, the temperature sensor 99, the first heating portion 100, the first heating portion driver 140, 160, or 180, the first heat source switching portion 199, the second heating portion 200, the rotating plate 300, the rotating plate driver 320, the area position sensor 340, the controller 400, a storage 410, the power supply 600, the user interface 800, and a communicator 870. Some of the above components may be omitted depending on an embodiment.

The cooking chamber 10 refers to a space in which a cooking object is accommodated and cooked. The temperature sensor 99 may sense temperatures of all or some of the rotating plate 300, the container 90 disposed on the rotating plate 300, and/or the cooking object 9 disposed in the container 90.

The first heating portion 100 may provide heat to some of the rotating plate 300, the container 90 disposed on the rotating plate 300, and/or the cooking object 9 disposed in the container 90.

The first heating portion driver 140, 160, or 180 provides a driving force to the first heating portion 100 to linearly move or rotate the first heating portion 100 such that the first heating portion 100 may approach the rotating plate 300. The first heating portion driver 140, 160, or 180 may be embodied using at least one motor and related components, and may be additionally use an actuator and the like as necessary.

The rotating plate 300 is provided to allow the container 90 in which the cooking object 9 is accommodated or the cooking object 9 to be directly disposed thereon and to rotate according to an operation of the rotating plate driver 320. The area position sensor 340 may sense a degree of rotation of the rotating plate 300, for example, a rotational angle from a reference point of the rotating plate 300.

The user interface 800 may include at least one of the display 810, the barcode scanner 830, and the inputter 850. Also, depending on embodiments, the user interface 800 may further include an RFID reader or an image acquisition device. The RFID reader or the image acquisition device may be provided instead of the barcode scanner 830, depending on embodiments.

Since the cooking chamber 10, the temperature sensor 99, the first heating portion 100, the rotating plate 300, the rotating plate driver 320, the area position sensor 340, and the user interface 800 have been described above, detailed descriptions thereof will be omitted below.

The first heat source switching portion 199 may allow certain currents to be supplied to the first heating portion 100 by connecting or disconnecting the power supply 600 to or from the first heating portion 100 under the control of the controller 400. The first heating portion 100 emits a certain level of heat corresponding to the supplied currents. In this case, the first heating source switching portion 199 may allow currents having various intensities to be applied to the first heating portion 100 by changing a level of voltage or a level of currents transferred to the first heating portion 100. Accordingly, the first heating portion 100 may emit various levels of heat depending on an applied currents.

The second heating portion 200 may heat all or most of the container 90 disposed on the rotating plate 300 and/or the cooking object 9 disposed in the container 90.

According to one embodiment, the second heating portion 200 may include the second heat source 210 configured to supply radiant heat to all or most of the cooking object 9 and a second heat source switching portion 299 which connects the second heat source 210 to the power supply 600.

The second heat source 210 generates heat by using electrical resistance and emits the heat as described above. Since the second heat source 210 has been described above, detailed descriptions of a structure and function thereof will be omitted below.

The second heat source switching portion 299 may allow certain currents to be supplied to the second heating portion 200 by connecting or disconnecting the power supply 600 to or from the second heating portion 200 under the control of the controller 400. The second heat source 210 may emit a certain level of heat corresponding to the supplied currents. The second heat source switching portion 299 is also provided to change a level of voltage or a level of currents transferred to the second heat source 210 as necessary.

Also, according to another embodiment, the second heating portion 200 may include the microwave emitter 230.

The microwave emitter 230 may generate and emit microwaves into the inside of the cooking chamber 10. The microwave emitter 230 may include an oscillator 231, a power feeder 232, and an antenna 233, as shown in FIG. 16.

The oscillator 231 receives power from the power supply 600, generates AC power at a predetermined frequency according to the supplied power, and transmits the AC power to the power feeder 232. The oscillator 231 may be embodied using one or more semiconductor chips and related components. As necessary, an amplifier for amplifying power may be further provided between the oscillator 231 and the power feeder 232.

The power feeder 232 supplies microwave power to the antenna 233. The power feeder 232 may be embodied using a power feeding apparatus having various structures designed for supplying output power to the antenna 233.

The antenna 233 may emit microwaves at a frequency according to the microwave power supplied by the power feeder 232 into a cooking space in the cooking chamber 10. The antenna 233 may be embodied using various types of antenna generally used for generating microwaves. A microwave guide apparatus (not shown) configured to guide a movement of the microwaves may be further provided at the cooking apparatus 1 to adequately emit the microwaves emitted from the antenna 233 into the inside of the cooking chamber 10. The microwave guide apparatus may be embodied using a certain metal plate with a recessed center in a longitudinal direction and may be installed, for example, at the top frame 10c of the cooking chamber 10.

The microwaves emitted by the microwave emitter 230 may be emitted into most of the space in the cooking chamber 10, and accordingly, the cooking object 9 and/or the container 90 disposed in the cooking chamber 10 may be heated by the microwaves to be cooked.

Depending on an embodiment, the second heating portion 200 may include all of the second heat source 210, the second heat source switching portion 299, and the microwave emitter 230, may include only the microwave emitter 230, or may include only the second heat source 210 and the heat source switching portion 299.

The controller 400 may control overall operations of the cooking apparatus 1.

For example, the controller 400 may control the first heating portion 100 and/or the second heat source 210 to emit heat by controlling the first heat source switching portion 199 and the second heat source switching portion 299.

In this case, the controller 400 may control the first heating portion 100 and the second heat source 210 to sequentially operate. For example, the controller 400 may control the first heating source switching portion 199 and the second heating source switching portion 299 to sequentially allow the second heat source 210 to emit heat first and the first heating portion 100 to emit heat when the heat emission of the second heat source 210 is finished.

Also, depending on embodiments, the controller 400 may control the first heating portion 100 and the second heat source 210 to simultaneously operate or may control the first heating portion 100 and the second heat source 210 to sequentially operate.

Also, depending on embodiments, the controller 400 may allow the cooking object 9 accommodated in the cooking chamber 10 to be heated by the microwaves emitted by the microwave emitter 230 by controlling the microwave emitter 230.

In this case, like the above description, the controller 400 may control the first heating portion 100 and the microwave emitter 230 to sequentially operate or may allow, for example, the first heating portion 100 to operate after an operation of the microwave emitter 230 is finished.

Also, depending on embodiments, the controller 400 may control the first heating portion 100 and the microwave emitter 230 to simultaneously operate or may control the first heating portion 100 and the microwave emitter 230 to sequentially operate.

Also, the controller 400 may also control a position shift of the first heating portion 100.

Also, the controller 400 may control the rotating plate 300 to rotate in a certain direction by transmitting a control signal to the rotating plate driver 320, may control the rotating plate 300 to stop being rotated depending on a sensing result of the area position sensor 340, and/or may control the first heating portion 100 to emit heat toward a partial area of the rotating plate 300.

Also, the controller 400 may control the first heating portion 100 to emit heat on the basis of a temperature sensing result of the temperature sensor 99. In this case, the first heat source switching portion 199 is controlled to allow the first heating portion 100 to emit heat corresponding to the temperature sensing result.

The controller 400, according to one embodiment, may be embodied using a micro controller unit (MCU) or a central processing unit (CPU) including at least one semiconductor chip and related components. The MCU or CPU may be provided in the electronic component chamber of the cooking apparatus 1 and may be provided, for example, to be installed on a substrate mounted in the electronic component chamber.

The controller 400 may perform the above-described operation by executing a program for implementing various operations of the controller 400. In this case, the program executed by the controller 400 may be stored in the storage 410 and may then be called up by the controller 400 to be transmitted to the controller 400 as necessary.

The storage 410 may be provided to communicate with the controller 400 through a circuit, a conducting wire, or the like, and may temporarily or permanently store various pieces of data, programs, or the like necessary for the operation of the controller 400. For example, the storage 410 may store information on cooking conditions of a cooking object or various pieces of information on a cooking operation mode of the cooking apparatus 1. The controller 400 may generate control signals with respect to components on the basis of the information on the cooking conditions of the cooking object or the various pieces of information on the cooking operation mode of the cooking apparatus 1.

The storage 410 may include a main memory device and/or an auxiliary memory device. The main memory device may be embodied using various types of storage medium such as a read-only memory (ROM) and a random-access memory (RAM). The auxiliary memory device may be embodied using various storage media capable of storing information such as a solid state drive (SSD), a hard disk drive (HDD), a compact disc, a laser disc, a magnetic tape, a magneto-optical disc, and a floppy disk.

The power supply 600 supplies power necessary for operations of components of the cooking apparatus 1. The power supply 600 may be provided to receive power supplied from an external commercial power source, may transfer the supplied power to the components, and may perform a rectification function or step-up/step-down function as necessary. The power supply 600 may be embodied using a battery depending on embodiments.

The communicator 870 may be provided to communicate with an external terminal device, another cooking apparatus, and the like. Here, the terminal device may include various types of computable devices such as a smart phone, a cellular phone, a laptop computer, a desktop computer, a navigation device, a tablet personal computer (PC), a personal digital assistant (PDA), and the like.

The communicator 870 may receive various pieces of information necessary for the operation of the cooking apparatus 1 from the external terminal device, other cooking apparatus, or the like, and may transmit the received information to the controller 400. Like the above description, the information necessary for the operation of the cooking apparatus 1 may include cooking conditions of a cooking object, a type of the cooking object, an amount of the cooking object, an operation mode of the cooking apparatus 1, and the like. Accordingly, a user may input a command necessary for the operation of the cooking apparatus 1 to the cooking apparatus 1 by using a terminal device such as a smart phone. In this case, the user may take a picture of a barcode printed on the container 90 of the cooking object 9 by using a camera installed in the terminal device, and the terminal device may transmit the picture of the barcode or information extracted from the barcode to the controller 400 through the communicator 870.

The communicator 870 may perform communication with an external terminal device or another cooking apparatus by using a wired communication network and/or a wireless communication network. The wired communication network may be constructed by using a communication cable such as a pair cable, a coaxial cable, an optical fiber cable, and an Ethernet cable. The wireless communication network may be constructed by using a wireless communication technology based on at least one of a short-range communication technology and a mobile communication technology. The short-range communication technology may include RFID, wireless fidelity (Wi-Fi), Wi-Fi direct, ZigBee, Bluetooth, Bluetooth low energy, and/or near field communication (NFC). The mobile communication technology may include various wireless communication technologies embodied on the basis of various mobile communication standards such as 3GPP, 3GPP2, and/or WiMAX.

The communicator 870 may be omitted depending on embodiments.

Hereinafter, referring to FIGS. 17A to 25, a method of controlling a cooking apparatus according to an operation of a controller will be described.

Figure 17A:
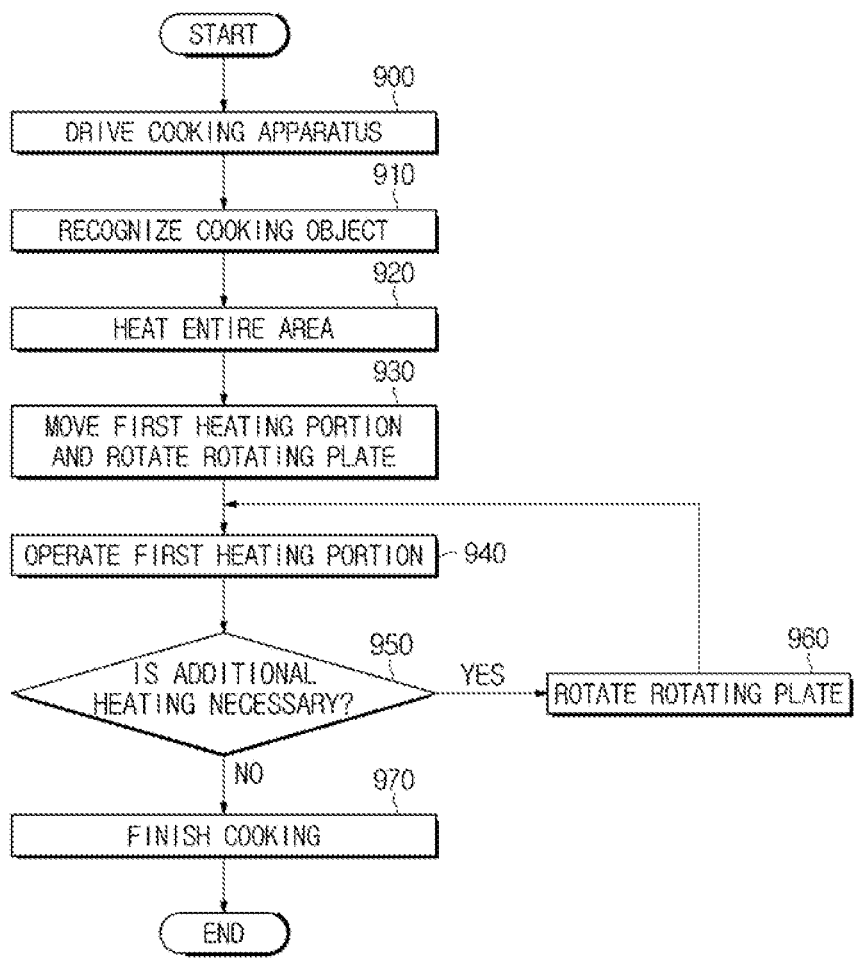
FIG. 17A is a first flowchart illustrating one embodiment of a method of controlling the cooking apparatus.

FIG. 17A is a first flowchart illustrating one embodiment of a method of controlling a cooking apparatus.

Referring to FIG. 17A, when the cooking apparatus 1 starts operating (900), the cooking apparatus 1 may receive information on a cooking object and may identify the cooking object (910). The cooking apparatus 1 may receive the information on the cooking object by using at least one of the barcode scanner 830, the inputter 850, the communicator 870, an image acquisition device, and an RFID reader.

Before, after, or while the cooking apparatus 1 receives the information on the cooking object, the cooking object is accommodated in the cooking chamber 10 of the cooking apparatus 1. Here, the cooking object may include a plurality of pieces of food having different cooking conditions.

The cooking apparatus 1 heats an entirety of the inside of the cooking chamber 10 (920). The cooking apparatus 1 may heat the entirety of the inside of the cooking chamber 10 by supplying heat to most of a space in the cooking chamber 10 by using the second heating portion 200, for example, the second heat source 210 or the microwave emitter 230. Accordingly, all of the food inserted into the cooking chamber 10 may be heated and cooked.

When the heating of the entire inside of the cooking chamber 10 is finished, the rotating plate 300 rotates to allow at least one area of the plurality of areas 301 to 303, for example, the first area 301, to reach a heating position, and the first heating portion 100 moves to the target position L1 adjacent to the heating position according to driving of the first heating portion driver 140, 160, or 180 (930). The rotation of the rotating plate 300 and the movement of the first heating portion 100 may be simultaneously or sequentially performed.

When any one area of the rotating plate 300 reaches the heating position and the first heating portion 100 also reaches the target position, the first heating portion 100 starts emitting heat and the first area 301 of the rotating plate 300, which reached the heating position, may be selectively heated by the heat emitted by the first heating portion 100 (940).

In advance of or after completion of the heating by the first heating portion 100, the controller 400 determines whether it is necessary to further heat another area, for example, the second area 302, in addition to the heated area, for example, the first area 301, on the basis of the information on the cooking object (950).

When it is necessary to further heat another area, for example, the second area 302, in addition to the at least one area of the plurality of areas 301 to 303 (Yes in 950), the rotating plate 300 restarts rotation to allow the second area 302 to move to the heating position (960).

Like the above description, the first heating portion 100 starts emitting heat and the second area 302, which reached the heating position, may be selectively heated by the heat emitted by the first heating portion 100 (940). Accordingly, such a plurality of areas 301 and 302 may be heated. According to one embodiment, the first heating portion 100 may emit a smaller amount of heat toward the second area 302 than toward the first area 301 such that the first area 301 and the second area 302 may be differently heated and cooked.

Subsequently, the controller 400 may determine whether it is necessary to further heat another area, for example, the third area 303, in addition to the heated areas, for example, the first area 301 and the second area 302, on the basis of the information on the cooking object (950). As described above, the controller 400 may determine whether it is necessary to heat each of the plurality of areas 301 to 303 and repeat a process including the rotation of the rotating plate 300 and the operation of the first heating portion 100 to control the plurality of areas to be selectively heated (940, 950, and 960).

When it is unnecessary to further heat another area, the cooking apparatus 1 finishes the cooking operation (970).

Through the above-described process, it is possible to differently heat and cook cooking objects having different heating conditions in one cooking chamber 10. Accordingly, cooking quality of the cooking apparatus 1 may be improved, and a user may also more conveniently obtain a plurality of types of food differently heated and cooked.

Figure 17B:
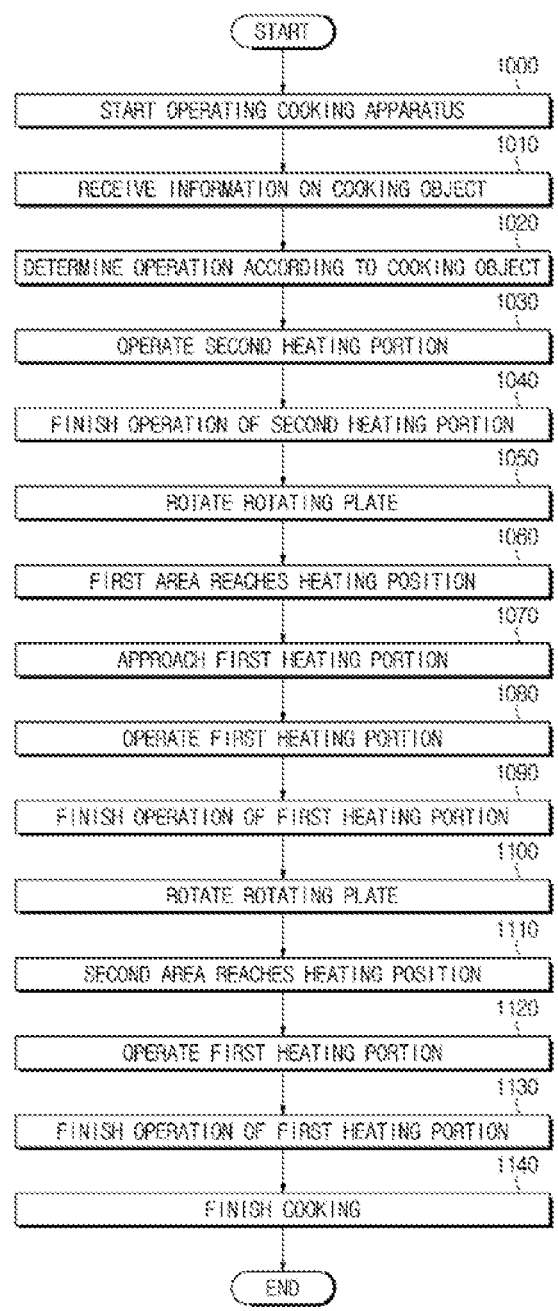
FIG. 17B is a second flowchart illustrating one embodiment of the method of controlling the cooking apparatus.

FIG. 17B is a second flowchart illustrating one embodiment of the method of controlling the cooking apparatus.

Figure 18:
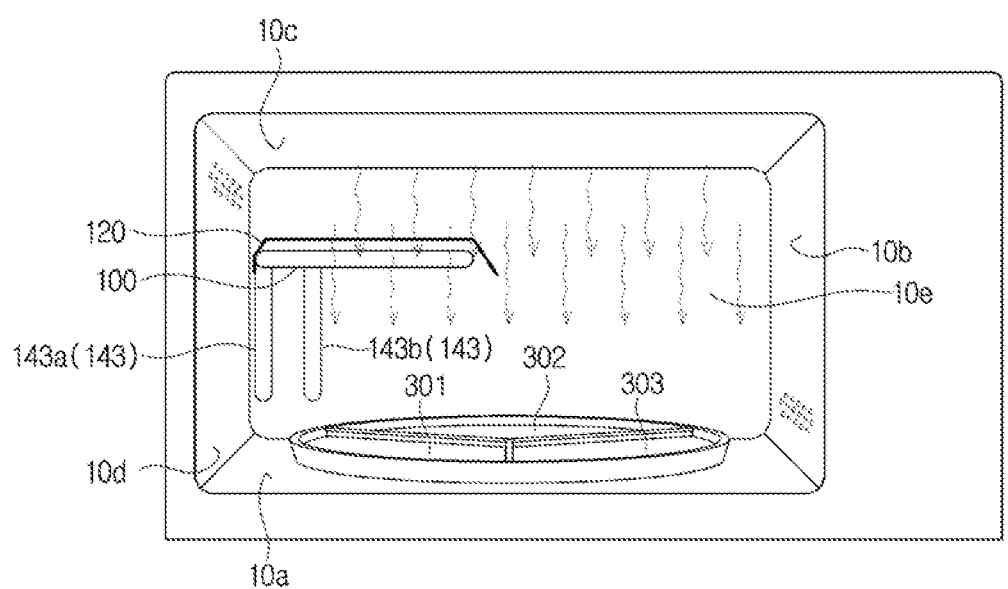
FIG. 18 is a first view illustrating operations of the rotating plate and a first heating portion under control of a controller.
Figure 19:
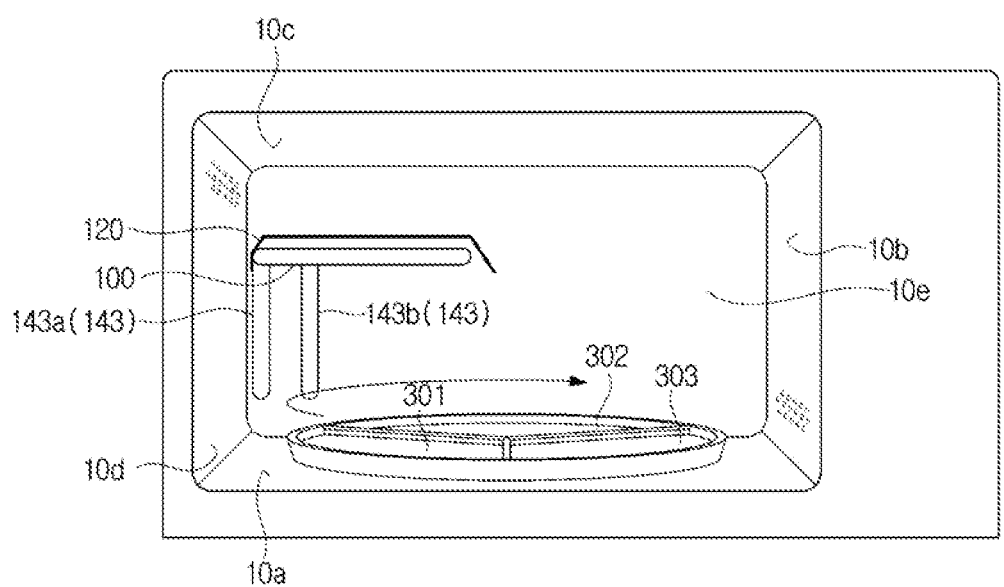
FIG. 19 is a second view illustrating the operations of the rotating plate and the first heating portion under the control of the controller.
Figure 20:
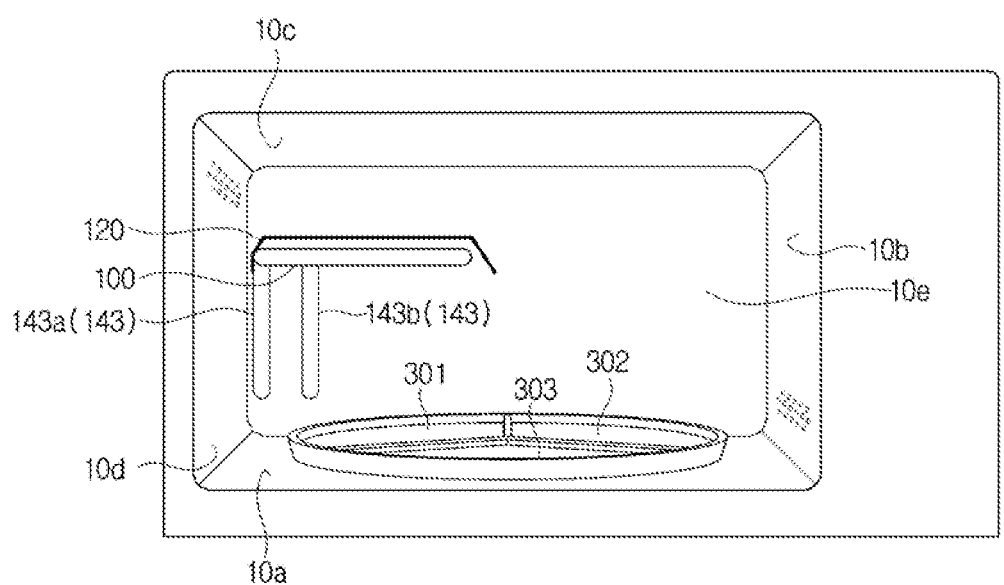
FIG. 20 is a third view illustrating the operations of the rotating plate and the first heating portion under the control of the controller.
Figure 21:
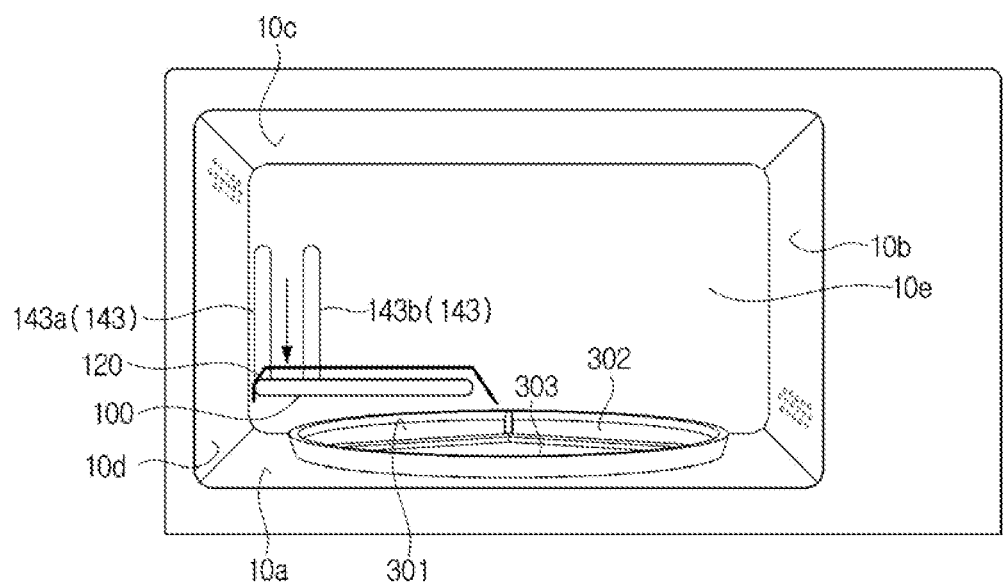
FIG. 21 is a fourth view illustrating the operations of the rotating plate and the first heating portion under the control of the controller.
Figure 22:
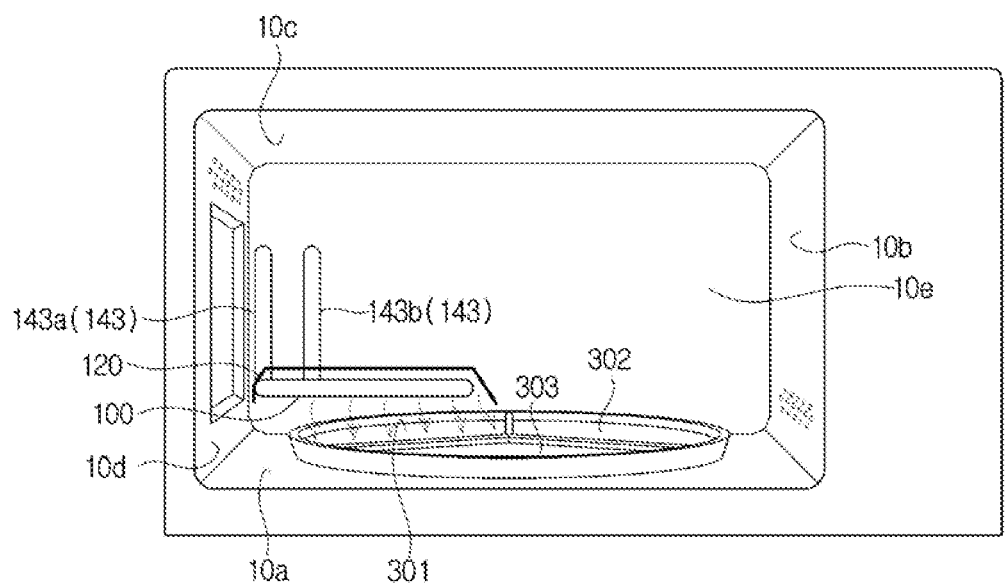
FIG. 22 is a fifth view illustrating the operations of the rotating plate and the first heating portion under the control of the controller.
Figure 23:
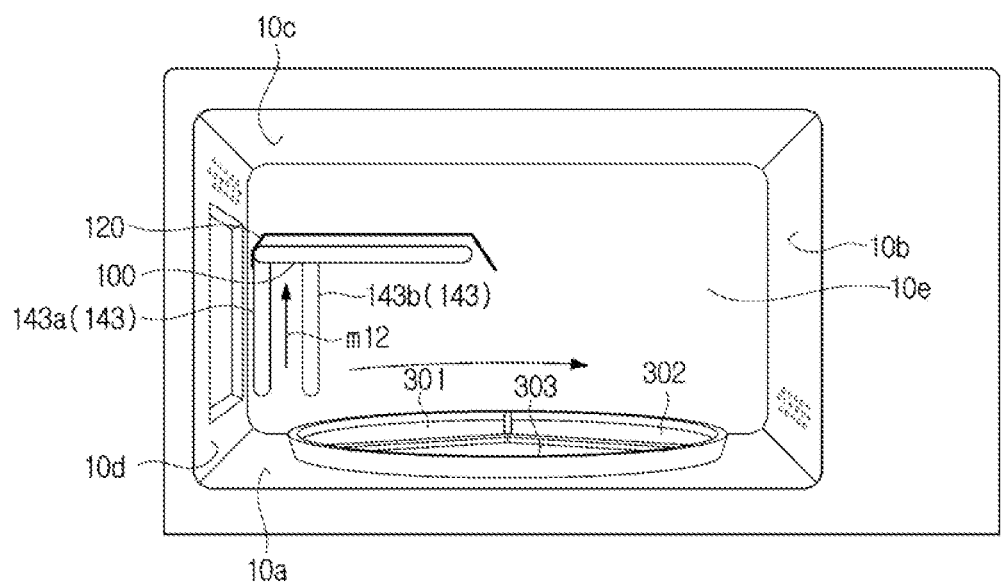
FIG. 23 is a sixth view illustrating the operations of the rotating plate and the first heating portion under the control of the controller.
Figure 24:
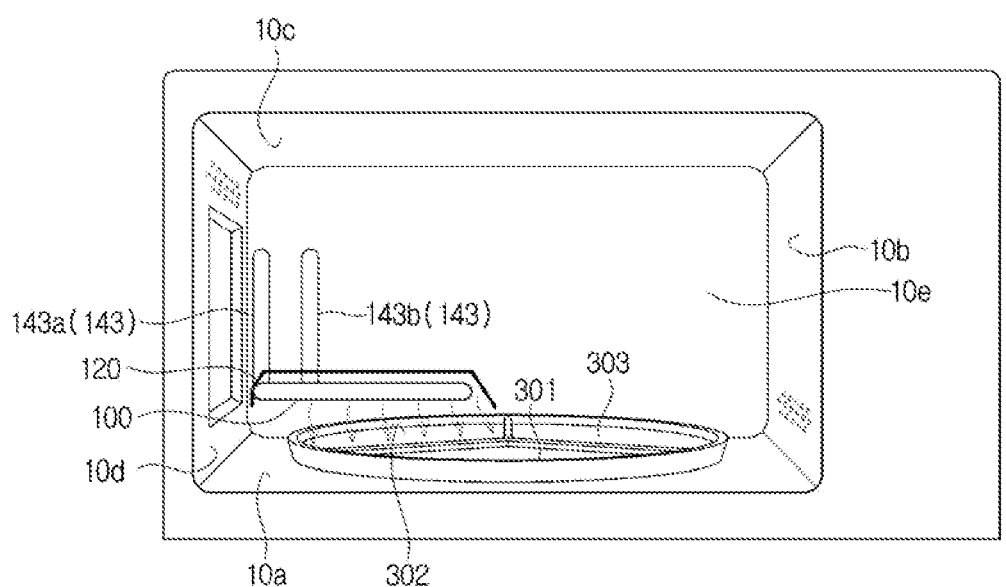
FIG. 24 is a seventh view illustrating the operations of the rotating plate and the first heating portion under the control of the controller.
Figure 25:
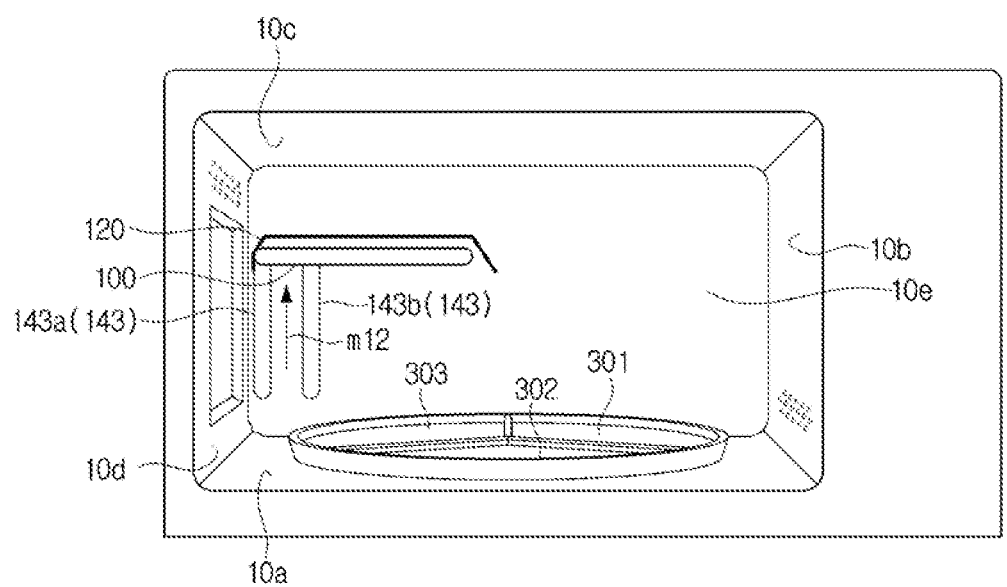
FIG. 25 is an eighth view illustrating the operations of the rotating plate and the first heating portion under the control of the controller.

FIG. 18 is a first view illustrating operations of the rotating plate and the first heating portion under the control of the controller, and FIG. 19 is a second view illustrating the operations of the rotating plate and the first heating portion under the control of the controller. FIG. 20 is a third view illustrating the operations of the rotating plate and the first heating portion under the control of the controller, and FIG. 21 is a fourth view illustrating the operations of the rotating plate and the first heating portion under the control of the controller. FIG. 22 is a fifth view illustrating the operations of the rotating plate and the first heating portion under the control of the controller, and FIG. 23 is a sixth view illustrating the operations of the rotating plate and the first heating portion under the control of the controller. FIG. 24 is a seventh view illustrating the operations of the rotating plate and the first heating portion under the control of the controller, and FIG. 25 is an eighth view illustrating the operations of the rotating plate and the first heating portion under the control of the controller.

As shown in FIG. 17B, the cooking apparatus 1 may start operating and may variously prepare for various operations necessary for cooking according to an operation of a user or predefined settings (1000).

Subsequently, the cooking apparatus 1 may receive information on a cooking object and may receive information on an operation mode of the cooking apparatus 1, depending on embodiments (1010). As described above, the cooking apparatus 1 may receive the information on the cooking object by using at least one of the barcode scanner 830, the inputter 850, the communicator 870, an image acquisition device, and an RFID reader.

The controller 400 determines an operation to be performed by the cooking apparatus 1 on the basis of the information on the cooking object and/or the information on the operation mode of the cooking apparatus 1 (1020). For example, when the cooking object includes foods having different cooking conditions, such as meat, grains, and vegetables, and it is necessary to cook a plurality of types of food having different cooking conditions in one cooking space, the controller 400 may determine to cook the foods through the following process.

Also, the controller 400 may determine a level of heat which will be generated by the first heating portion 100 and/or the second heating portion 200, a heat supply time, a microwave frequency, and/or a microwave emission time.

In advance of, after, or while any one of during the above-described starting of operation and determining of an operation to be performed of the cooking apparatus 1 to determining the operation according to the cooking object (1000 to 1020), the user may open the door 30 and may insert the cooking object into the cooking chamber 10. Here, the cooking object includes a plurality of types of food having different cooking conditions.

In this case, cooking objects may be disposed in different areas 301 to 303 of the rotating plate 300. That is, when a large amount of heat is necessary for cooking, for example, meat, the meat is disposed in the first area 301. When a small amount of heat is necessary for cooking, for example, grains, the grains are disposed in the second area 302. When no heat or less heat is necessary for cooking, for example, vegetables, the vegetables may be disposed in the third area 303.

Subsequently, as shown in FIG. 18, the controller 400 controls the second heating portion 200 to heat the inside of the cooking chamber 10 with a certain amount of heat for a certain time (1030). As described above, the second heating portion 200 may the second heat source 210 installed at the top frame 10c of the cooking chamber 10, or may be the microwave emitter 230 which emits microwaves into the inside of the cooking chamber 10. Accordingly, heat is supplied to all of the cooking objects inserted into the cooking chamber 10, that is, the plurality of types of food.

When a time determined by the controller 400, that is, an operation time of the second heating portion 200, passes, the controller 400 finishes the operation of the second heating portion 200 (1040).

Subsequently, as shown in FIG. 19, the controller 400 controls the rotating plate 300 to rotate in a certain direction (1050). The rotating plate 300 may rotate in at least one direction R1 or R2 preset by an operation of the rotating plate driver 320. In this case, the controller 400 may determine positions of the areas of the rotating plate 300, that is, the first to third areas 301 to 303, on the basis of a signal transmitted from the area position sensor 340.

As a result of the determination, when the first area 301 in which meat is disposed approaches a heating position, as shown in FIG. 20 (1060), in other words, when the first area 301 reaches an area to which heat is supplied by the first heating portion 100, the controller 400 transmits a control signal to the rotating plate driver 320 to allow the rotating plate 300 to stop rotating and controls the first heating portion 100 to allow the first heating portion 100 to reach a target position adjacent to the heating position, as shown in FIG. 21 (1070).

Depending on embodiments, the first heating portion 100 may be controlled to reach the target position adjacent to the heating position for heating the first area 301 before the rotating plate 300 starts rotating or while the rotating plate 300 is rotating.

Depending on an embodiment, as described above, the first heating portion 100 vertically moves and reaches the target position adjacent to the heating position or rotates toward the rotating plate 300 and reaches the heating position.

When the first heating portion 100 reaches the heating position, the controller 400 may control the first heat source switching portion 199 to apply power supplied from the power supply 600 to the first heating portion 100 (1080). Accordingly, the first heating portion 100, as shown in FIG. 22, starts a heating operation with respect to the first area 301 of the rotating plate 300.

Since the first heating portion 100 supplies heat to a certain range from the target position, for example, some areas of the rotating plate 300, and does not supply heat to the other areas, additional heat generated by the first heating portion 100 is provided to a food disposed in the first area 301, such as the meat, and the additional heat is hardly supplied to foods disposed in the other areas 302 and 303, such as the grains and vegetables. Accordingly, it is possible to heat only the food disposed in the first area 301 such as the meat.

The first heating portion 100 provides a certain level of heat for a certain time according to the determination of the controller 400. The first heating portion 100 may supply more heat and/or may supply heat for a longer time to the first area 301 than to the second area 302 or the third area 303.

When the first heating portion 100 operates for a predefined time or a temperature sensed by the temperature sensor 99 is identical to a preset target temperature, the first heating portion 100 finishes operation (1090). In other words, the first heating portion 100 is controlled not to emit heat any more. In this case, depending on an embodiment, the first heating portion 100 may be controlled to return to an initial position, as shown in FIG. 23, or may be controlled to continuously stand by at the heating position.

As shown in FIG. 23, the rotating plate 300 restarts rotation (1100). A rotational motion of the rotating plate 300 may be started after the operation of the first heating portion 100 is finished, while the first heating portion 100 performs returning to the initial position, after the returning of the first heating portion 100 to the initial position is finished, or before the operation of the first heating portion 100 is finished. In this case, a rotational direction of the rotating plate 300 may be identical to or different from the rotational direction in 1050. The rotating plate 300 may continuously perform the rotational motion until the second area 302 of the rotating plate 300 reaches the heating position.

When the second area 302 of the rotating plate 300 reaches the heating position, the rotation of the rotating plate 300 is finished (1110).

As shown in FIG. 24, the first heating portion 100 provides heat to the second area 302 disposed at the heating position under the control of the controller 400 (1120). When the first heating portion 100 is controlled to return to the initial position after the operation of the first heating portion 100 is finished, the first heating portion 100 may be controlled to vertically move or rotate to reach the target position adjacent to the heating position before the first heating portion 100 provides heat to the second area 302. When the first heating portion 100 continuously stands by at the heating position, the first heating portion 100 does not move and starts emitting heat.

As described above, since the first heating portion 100 supplies heat to a certain range from the heating position, for example, some areas of the rotating plate 300, and does not supply heat to the other areas, additional heat generated by the first heating portion 100 is provided to the food disposed in the second area 302, such as the grains, and the heat is not supplied to the food disposed in the other areas 301 and 303, such as the meat and vegetables.

In this case, when the heat is supplied to the second area 302, the first heating portion 100 is controlled to operate for a shorter time, to supply less heat thereto or to supply less heat thereto for a shorter time than when supplying heat to the first area 301. Accordingly, the cooking object disposed in the second area 302, such as the grains, may be less heated than the cooking object disposed in the first area 301, such as the meat. Accordingly, the cooking object in the first area 301 and the cooking object in the second area 302 may be differently cooked.

When the first heating portion 100 supplies heat to the second area 302 for a predefined time, the first heating portion 100 finishes the operation and stops supplying heat (1130).

Depending on an embodiment, the first heating portion 100 may be controlled to return to the initial position again. Also, the first heating portion 100 may be controlled to continuously stand by at the heating position, depending on an embodiment. For example, as described below, when supplying heat to the cooking object disposed in the third area 303, the first heating portion 100 may be controlled to stand by at the heating position.

When the heating of the meat and grains in the first area 301 and the second area 302 is finished, cooking of the cooking objects is finished (1140).

As shown in FIG. 25, depending on embodiments, when it is also necessary to further heat the cooking object disposed in the third area 303, such as the vegetables, the rotating plate 300 restarts rotation until the third area 303 reaches the heating position, as described above. When the third area 303 reaches the heating position, the first heating portion 100 may supply heat to the third area 303. In this case, the first heating portion 100 is controlled to supply heat to the third area 303 for a shorter time or to supply less heat to the third area 303 than when supplying heat to at least one of the first area 301 and the second area 302. However, depending on embodiments, the first heating portion 100 may be controlled to supply less heat to the third area 303 for a shorter time.

Through the above-described process, the cooking object disposed in the third area, such as the vegetables, may be differently heated and cooked from the cooking objects disposed in the first area 301 and the second area 302.

When the cooking of the third area 303 is finished, the first heating portion 100 may be controlled to return to the initial position again.

Although one example of the method of controlling the cooking apparatus 1 in which the rotating plate 300 is divided into the first to third areas 301 to 303 has been described above, the number of divided areas of the rotating plate 300 is not limited thereto. For example, the rotating plate 300 may be divided into a first area and a second area or may be divided into four or more areas. When the rotating plate 300 is designed to be divided into four or more areas, it is possible to cook four or more cooking objects having different conditions.

Figure 26:
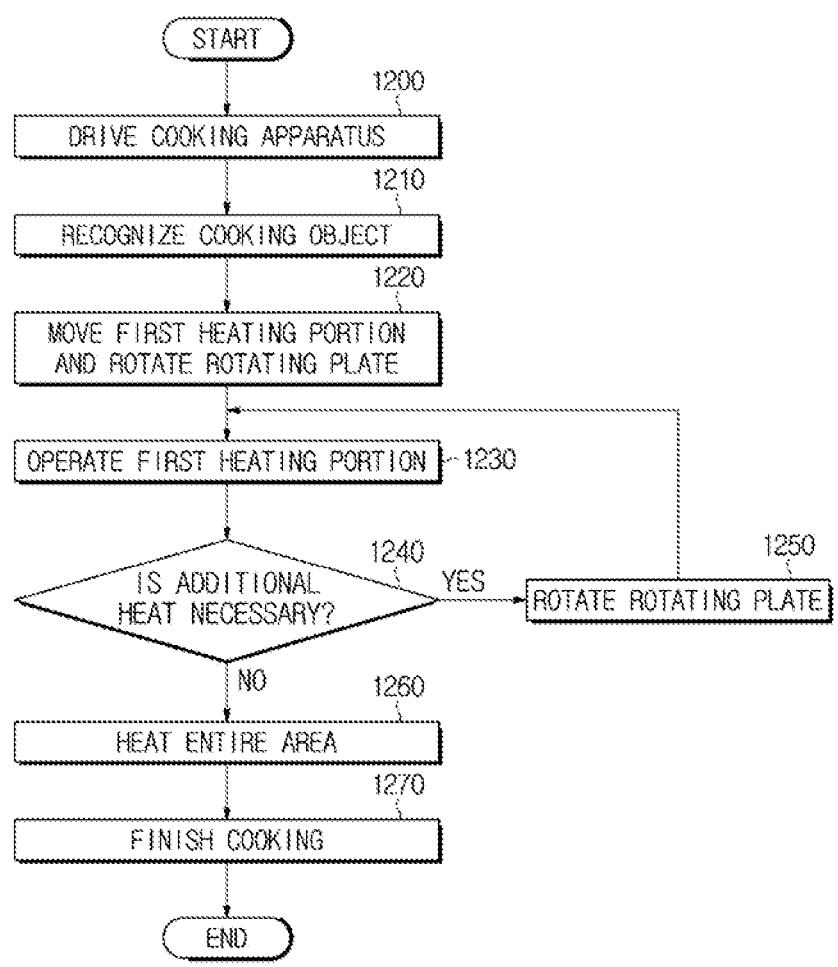
FIG. 26 is a flowchart illustrating one embodiment of the method of controlling the cooking apparatus.

FIG. 26 is a flowchart illustrating another embodiment of the method of controlling the cooking apparatus.

As shown in FIG. 26, when the cooking apparatus 1 starts operating (1200), the cooking apparatus 1 may receive information on a cooking object and may identify the cooking object (1210), as described above. The cooking apparatus 1 may receive the information on the cooking object by using at least one of the barcode scanner 830, the inputter 850, the communicator 870, an image acquisition device, and an RFID reader.

Also, before, after, or while the cooking apparatus 1 receives the information on the cooking object, the cooking object may be accommodated in the cooking chamber 10 of the cooking apparatus 1. Here, the cooking object may include a plurality of pieces of food having different cooking conditions.

Subsequently, the rotating plate 300 on which the cooking object is mounted rotates to allow at least one area of the plurality of areas 301 to 303 of the rotating plate 300, for example, the first area 301, to reach a heating position, and the first heating portion 100 moves to the target position L1 adjacent to the heating position according to driving of the first heating portion driver 140, 160, or 180 (1220). The rotation of the rotating plate 300 and the movement of the first heating portion 100 may be simultaneously or sequentially performed.

When any one area of the rotating plate 300 reaches the heating position and the first heating portion 100 also reaches the target position, the first heating portion 100 starts emitting heat, and the emitted heat is incident on the first area 301 (1230). Accordingly, the first area 301 may be heated unlike the other areas 302 and 303.

The controller 400 may determine whether it is necessary to further heat another area, for example, the second area 302, in addition to the heated area, for example, the first area 301, on the basis of the information on the cooking object (1240).

When it is necessary to further heat another area, for example, the second area 302, in addition to at least one of the plurality of areas 301 to 303 (Yes in 1240), before or after the heating of the first area 301 is finished, the rotating plate 300 restarts rotation until the second area 302 moves the above-described heating position (1250).

When the second area 302 reaches the above-described heating position, the first heating portion 100 starts emitting heat, and the second area 302, which reached the heating position, may be selectively heated by the heat emitted from the first heating portion 100 (1230). Depending on embodiments, the first heating portion 100 may emit less heat toward the second area 302 than toward the first area 301.

The controller 400 may determine whether it is necessary to further heat another area, for example, the third area 303, in addition to the heated areas, for example, the first area 301 and the second area 302, on the basis of the information on the cooking object (1240). According to a result of the determination, the first heating portion 100 and the rotating plate driver 320 connected to the rotating plate 300 may be controlled (1230 and 1250).

The rotation of the rotating plate 300 and the operation of the first heating portion 100 may be repeated a plurality of times as necessary, and accordingly the plurality of areas may be selectively heated.

Subsequently, the controller 400 of the cooking apparatus 1 controls the second heating portion 200, for example, the second heat source 210 or the microwave emitter 230, to heat an entire internal space of the cooking chamber 10 (1260). Accordingly, heat is supplied to all pieces of food disposed in the above-described plurality of areas 301 to 303.

When a cooking completion condition is determined to be satisfied on the basis of whether a cooking time has passed or a temperature of the inside of the cooking chamber 10 and the like, the second heating portion 200 of the cooking apparatus 1 finishes the operation, and accordingly the heating of the entire inside of the cooking chamber 10 is finished.

When the heating of the entire inside of the cooking chamber 10 is finished, the cooking apparatus 1 finishes the cooking operation (1270).

A program for implementing the above-described method of controlling the cooking apparatus may be recorded in a computer-readable recording medium. The computer-readable recording medium may include various types hardware devices capable of storing a particular program implemented by a call up of a computer and the like, for example, a magnetic disk storage medium, such as a hard disk, a floppy disk, and a magnetic tape, an optical medium, such as a compact disc (CD) and a digital versatile disc (DVD), a magneto-optical medium, such as a floptical disk, a semiconductor storage device, such as a ROM, a RAM, and/or a flash memory, and the like.

As should apparent from the above description, a cooking apparatus and a method of controlling the cooking apparatus in accordance with one embodiment can provide an effect of cooking a plurality of types of food having different cooking conditions in one cooking space.

In accordance with the above-described cooking apparatus and the method of controlling the cooking apparatus, some of a plurality of cooking objects in a cooking space can be selectively heated such that the plurality of cooking objects can be cooked at different temperatures.

In accordance with the above-described cooking apparatus and the method of controlling the cooking apparatus, since a plurality of cooking objects having different cooking conditions can be cooked in one cooking space, a cooking time can be reduced and cooking quality and user convenience can be improved.

Although a few embodiments of the present disclosure have been shown and described, it should be appreciated by those skilled in the art that changes may be made in these embodiments without departing from the principles and spirit of the present disclosure, the scope of which is defined in the claims and their equivalents.

What is claimed is:

1. A cooking apparatus comprising:
   a cooking chamber;
   a cooking plate including a visual representation distinguishing a plurality of areas on a top surface of the cooking plate;
   a plurality of heaters installed in the cooking chamber and configured to supply heat to the plurality of areas, the plurality of heaters including a first heater parallel to the cooking plate and a second heater; and
   a controller configured to:
      receive information about a cooking object including a plurality of pieces of food having different cooking conditions, the plurality of pieces of food including a first piece of the food being disposed on the first area of the plurality of areas and the a second piece of the food being disposed on the second area of the plurality of areas;
      based on the information about the cooking object, determine a first heating intensity to be used to heat the first piece of the food, and a second heating intensity to be used to heat the second piece of the food;
      control the first heater to supply heat of the first heating intensity to the first area, and;
      control the first heater to supply heat of the second heating intensity to the second area;
      after controlling the first heater to supply heat to the first area and the second area, respectively, control the second heater to supply heat to entire internal space of the cooking chamber; and
      based on a cooking completion condition being satisfied, control the second heater to stop supplying heat to the entire internal space of the cooking chamber.

2. The cooking apparatus of claim 1, wherein the controller is configured to:
   determine the first heating intensity to be greater than the second heating intensity based on the first piece of the food being determined as meat and the second piece of the food being determined as grains or vegetables.

3. The cooking apparatus of claim 1, wherein the controller is further configured to:
   based on the information about the cooking object, determine a first heating duration to be used to heat the first piece of the food, and a second heating duration to be used to heat the second piece of the food,
   control the plurality of heaters to supply heat for the first heating duration to the first area, and
   control the plurality of heaters to supply heat for the second heating duration to the second area.

4. The cooking apparatus of claim 1, further comprising a temperature sensor configured to measure a temperature of the first piece of the food and the second piece of the food, wherein the controller is further configured to:
   determine a first target temperature and a second target temperature based on the information about the cooking object,
   control the plurality of heaters to stop supplying heat to the first area based on the temperature of the first piece of the food being equivalent to the first target temperature, and
   control the plurality of heaters to stop supplying heat to the second area based on the temperature of the second piece of the food being equivalent to the second target temperature.

5. The cooking apparatus of claim 4, wherein the temperature sensor is an infrared sensor.

6. The cooking apparatus of claim 1, further comprising a camera configured to detect positions of the first piece of the food and the second piece of the food.

7. The cooking apparatus of claim 1, wherein the processor controller is further configured to control the first heater to move up and down with respect to the cooking plate in order to control the intensity of the heat to the first area.

8. A method of controlling a cooking apparatus comprising a cooking plate including a visual representation distinguishing a plurality of areas on a top surface of the cooking plate and a plurality of heaters installed in a cooking chamber and configured to supply heat to the plurality of areas, the plurality of heaters including a first heater parallel to the cooking plate and a second heater, comprising:
   receiving information about a cooking object including a plurality of pieces of food having different cooking conditions, the plurality of pieces of food including a first piece of the food being disposed on the first area of the plurality of areas and the second piece of the food being disposed on the second area of the plurality of areas;
   based on the information about the cooking object, determining a first heating intensity to be used to heat the first piece of the food, and a second heating intensity to be used to heat the second piece of the food;
   controlling the first heater to supply heat of the first heating intensity to the first area; and
   controlling the first heater to supply heat of the second heating intensity to the second area;
   after controlling the first heater to supply heat to the first area and the second area, respectively, controlling the second heater to supply heat to entire internal space of the cooking chamber; and
   based on a cooking completion condition being satisfied, controlling the second heater to stop supplying heat to the entire internal space of the cooking chamber.

9. The method of claim 8, wherein the determining of the first heating intensity and the second heating intensity comprising:
   determining the first heating intensity to be greater than the second heating intensity based on the first piece of the food being determined as meat and the second piece of the food being determined as grains or vegetables.

10. The method of claim 8, further comprising:
    based on the information about the cooking object, determining a first heating duration to be used to heat the first piece of the food, and a second heating duration to be used to heat the second piece of the food;
    controlling the plurality of heaters to supply heat for the first heating duration to the first area; and
    controlling the plurality of heaters to supply heat for the second heating duration to the second area.

11. The method of claim 8, further comprising:
    receiving, from a temperature sensor, information about a temperature of the first piece of the food and the second piece of the food;
    determining a first target temperature and a second target temperature based on the information about the cooking object,
    controlling the plurality of heaters to stop supplying heat to the first area based on the temperature of the first piece of the food being equivalent to the first target temperature, and
    controlling the plurality of heaters to stop supplying heat to the second area based on the temperature of the second piece of the food being equivalent to the second target temperature.

12. The method of claim 11, wherein the temperature sensor is an infrared sensor.

13. The method of claim 8, wherein the cooking apparatus is further comprising a camera configured to detect positions of the first piece of the food and the second piece of the food.

* * * * *